United States Patent
Ichikawa et al.

(10) Patent No.: US 9,237,013 B2
(45) Date of Patent: Jan. 12, 2016

(54) ENCRYPTED DATA MANAGEMENT DEVICE, ENCRYPTED DATA MANAGEMENT METHOD, AND ENCRYPTED DATA MANAGEMENT PROGRAM

(75) Inventors: Sachihiro Ichikawa, Tokyo (JP); Nori Matsuda, Tokyo (JP); Tadakazu Yamanaka, Tokyo (JP); Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/355,043

(22) PCT Filed: Dec. 20, 2011

(86) PCT No.: PCT/JP2011/079519
§ 371 (c)(1),
(2), (4) Date: Apr. 29, 2014

(87) PCT Pub. No.: WO2013/094018
PCT Pub. Date: Jun. 27, 2013

(65) Prior Publication Data
US 2014/0310521 A1 Oct. 16, 2014

(51) Int. Cl.
*H04L 9/08* (2006.01)
*H04L 9/30* (2006.01)

(52) U.S. Cl.
CPC ............ *H04L 9/0891* (2013.01); *H04L 9/0861* (2013.01); *H04L 9/3073* (2013.01)

(58) Field of Classification Search
CPC .... H04L 9/0891; H04L 9/0861; H04L 9/3073
USPC ........................................................ 713/165
See application file for complete search history.

(56) References Cited

U.S. PATENT DOCUMENTS 8,516,244 B2 * 8/2013 Waters .......................... 713/155
2012/0027201 A1 * 2/2012 Fujisaki et al. ................. 380/28
(Continued)

FOREIGN PATENT DOCUMENTS

| JP | 2003 506782 | 2/2003 |
| JP | 2005 51614 | 2/2005 |
| WO | 2011 086668 | 7/2011 |

OTHER PUBLICATIONS

Attrapadung et al. (Attribute-Based Encryption Supporting Direct/Indirect Revocation Modes, Cryptography and Coding 2009, LNCS 5921, pp. 278-300, 2009).*
(Continued)

*Primary Examiner* — Saleh Najjar
*Assistant Examiner* — Oleg Korsak
(74) *Attorney, Agent, or Firm* — Oblon, McClelland, Maier & Neustadt, L.L.P.

(57) ABSTRACT

An invalidation scheme of a secret key is implemented, which is usable for a functional encryption scheme. In a cryptographic processing system 10 employing an encryption scheme with which if attribute information and key information set in encrypted data do not correspond to attribute information and key information set in a secret key, the encrypted data cannot be decrypted using the secret key, an encrypted data management device 200 is provided, which carries out a relay between a user terminal 100 carrying out encryption and decryption of data and an encrypted data storage device 300 storing encrypted data. The encrypted data management device 200 determines whether or not a user whose secret key is invalid is included in users having attribute information set in the encrypted data acquired from the encrypted data storage device 300, and sets a different value as key information in the encrypted data based on the determination result. Then, the encrypted data management device 200 sends the encrypted data in which the key information is set to the user terminal 100.

11 Claims, 12 Drawing Sheets

(56) References Cited

U.S. PATENT DOCUMENTS

| | | | |
|---|---|---|---|
| 2012/0155635 A1* | 6/2012 | Vaikuntanathan et al. | 380/44 |
| 2012/0163588 A1* | 6/2012 | Kobayashi et al. | 380/28 |
| 2012/0284530 A1* | 11/2012 | Takashima et al. | 713/189 |
| 2012/0324240 A1 | 12/2012 | Hattori et al. | |

OTHER PUBLICATIONS

Hattori, M., et al., "Searchable Public-Key Encryption for Hierarchical Systems with Adaptive Join/Leave of Members", SCIS, pp. 1-8, (Jan. 25 to 28, 2011).

Muto, K., et al., "A Study on Key Management Mechanism for Information-Based Cryptosystem", SCIS, pp. 1-8, (Jan. 25 to 28, 2011).

Mitsunaga, T., "Implementation and Evaluation of Attribute Based Encryption with Revocation Function" DAI 73 KAI (Heisei 23 Nen) Zenkoku Taikai Koen Ronbunshu (3) Network Security, Total 4 Pages, (Mar. 2, 2011).

Okamoto, T., et al., "A Geometric Approach on Pairings and Hierarchical Predicate Encryption", EUROCRYPT, Total 1 Page, (2009).

Okamoto, T., et al., "Fully Secure Functional Encryption with General Relations from the Decisional Linear Assumption", Crypto, LNCS, vol. 6223/2010, pp. 191-208, (2010).

Lewko, A., et al., "Fully Secure Functional Encryption: Attribute-Based Encryption and (Hierarchical) Inner Product Encryption", EUROCRYPT, pp. 1-56, (2010).

International Search Report Issued Jan. 24, 2012 in PCT/JP11/079519 Filed Dec. 20, 2011.

Extended European Search Report issued Sep. 28, 2015 in Patent Application No. 11878276.2.

Tatsuaki Okamoto, et al., "Hierarchical Predicate Encryption for Inner-Products", Lecture Notes in Computer Science, vol. 5912, XP008155970, Dec. 2009, pp. 214-231.

* cited by examiner

ENCRYPTED DATA MANAGEMENT DEVICE, ENCRYPTED DATA MANAGEMENT METHOD, AND ENCRYPTED DATA MANAGEMENT PROGRAM

TECHNICAL FIELD

The present invention relates to management technique of encrypted data to implement invalidation of a secret key.

BACKGROUND ART

Various improvements and functional expansions have been implemented on the public key cryptosystem developed by Diffie and Hellman in 1976. In the year of 2001, a public key cryptosystem based on a pairing operation, which is called ID based encryption, was developed by Bonne and Franklin. Recent years, schemes based on the pairing operation have been ardently researched.

As a high-functional public key cryptosystem using the pairing, there is an encryption scheme (hereinafter, referred to as a functional encryption scheme) with enhanced security described in Non-Patent Literatures 1 and 2. Different from the conventional cryptosystem, the functional encryption scheme can implement encryption with specifying a plurality of users (secret keys) who can decrypt encrypted data using one public key.

When the public key cryptosystem is applied to a system used by general users, a secret key might be lost by a user. In this case, in order to prevent malicious use of the lost secret key, the lost secret key must be invalidated.

As an invalidation scheme to invalidate the secret key, schemes described in Patent Literatures 1 and 2 are available.

Patent Literature 1 describes an invalidation scheme to invalidate a secret key of a specific user when a command to invalidate the secret key of the specific user is input; and to generate a key pair of a new cipher key and a secret key when a command to re-issue a secret key is input.

Patent Literature 2 describes an invalidation scheme, when an access request and an access identifier are received, to check whether or not the access identifier and an identifier written in a list of invalidated identifiers are matched; and to terminate the access if the identifiers are matched.

CITATION LIST

Patent Literature

Patent Literature 1: JP-A-2005-51614
Patent Literature 2: JP-T-2003-506782

Non-Patent Literature

Non-Patent Literature 1: T. Okamoto, K. Takashima, "A geometric approach on pairings and hierarchical predicate encryption", In: Poster session, EUROCRYPT 2009.
Non-Patent Literature 2: T. Okamoto, K. Takashima, "Fully Secure Functional Encryption With General Relations from the Decisional Linear Assumption", CRYPTO 2010, Lecture Notes In Computer Science, 2010, Volume 6223/2010.

SUMMARY OF INVENTION

Technical Problem

Since the functional encryption scheme is an encryption scheme which is largely different from the conventional scheme, the invalidation scheme of the secret key which has been applied to the conventional encryption scheme cannot be applied. Further, in the functional encryption scheme, similarly to the conventional encryption scheme, the invalidation is not considered by the algorithm itself. Accordingly, the functional encryption scheme cannot deal with a case of losing the secret key, which likely occurs if the encryption scheme is applied to a system used by general users.

In the invalidation scheme described in Patent Literature 1, when the secret key is invalidated, a new key pair is re-issued. Accordingly, if this invalidation scheme is applied to the functional encryption scheme, all the data that have been encrypted to be decryptable by the invalid secret key must be re-encrypted. Therefore, it might be necessary to re-encrypt vast amount of past-encrypted data, which will cause tremendous cost.

Similarly, if the invalidation scheme described in Patent Literature 2 is applied to the functional encryption scheme, the data that have been encrypted to be decryptable by the invalid secret key must be re-encrypted.

A main object of the present invention is to implement an invalidation scheme of a secret key that is usable also in the functional encryption scheme.

Solution to Problem

According to the present invention, the encrypted data management device which manages encrypted data an encryption scheme with which if attribute information and key information set in encrypted data do not correspond to attribute information and key information set in a secret key, the encrypted data cannot be decrypted using the secret key, the encrypted data management device includes:

a data acquisition unit which acquires encrypted data in which attribute information is set from a storage device;

an invalidation determination unit which determines whether or not a user whose secret key is invalid is included in users having the attribute information set in the encrypted data acquired by the data acquisition unit;

a key information setting unit which sets a different value as key information in the encrypted data based on whether or not it is determined that the user whose secret key is invalid is included by the invalidation determination unit; and a data transmission unit which sends the encrypted data in which the key information is set by the key information setting unit to a user terminal.

Advantageous Effects of Invention

The encrypted data management device related to the present invention sends the encrypted data to the user after setting a different value as the key information based on whether or not the user whose secret key is invalidated is included in the users who can decrypt the encrypted data. This feature prevents the decryption of the encrypted data using the invalid secret key.

DESCRIPTION OF EMBODIMENTS

Figure 1:
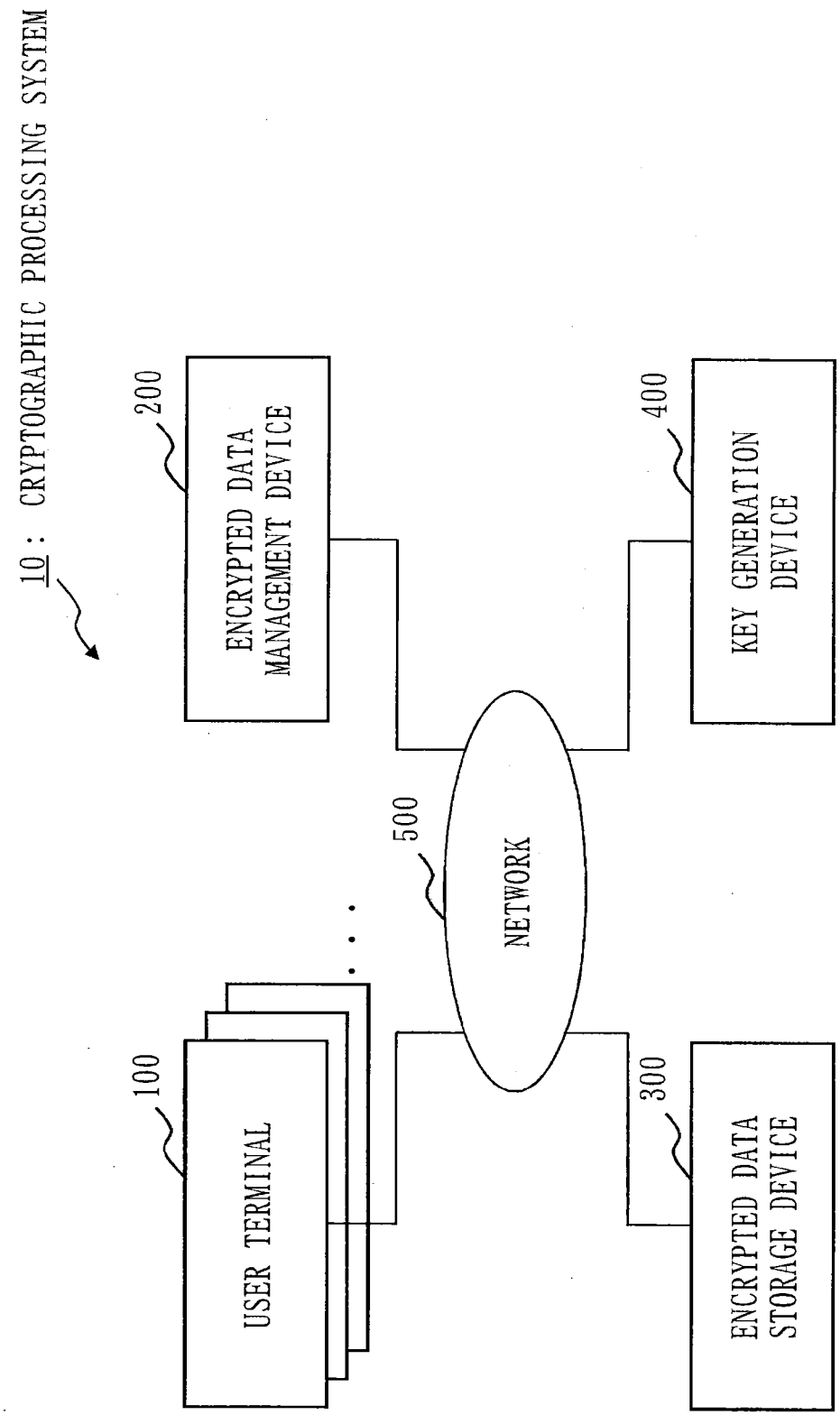
[FIG. 1] is a configuration diagram of a cryptographic processing system 10 related to a first embodiment.

Embodiment 1.

The first embodiment will explain a method to implement an invalidation scheme of a secret key in the functional encryption scheme described in Non-Patent Literature 1.

First, the functional encryption scheme described in Non-Patent Literature 1 will be explained with simplifying the explanation to only a part necessary for explaining the present embodiment.

The functional encryption scheme described in Non-Patent Literature 1 includes Setup algorithm, KeyGen algorithm, Enc algorithm, and Dec algorithm.

Setup algorithm is an algorithm to generate a public parameter pk and a master secret key sk.

Setup algorithm generates a parameter param of dual pairing vector spaces, and a basis B and a basis B* which are dual orthonormal bases that have been related with each other by a pairing operation. Then, the parameter param and the basis B are set as public parameters pk, and the basis B* is set as a master secret key sk.

Here, the basis B includes basis vectors $b_1, b_2, \ldots, b_{n+2}$, and the basis B* includes basis vector $b^*_1, b^*_2, \ldots, b^*_{n+2}$. That is, the basis B and the basis B* respectively include n+2 number (n being an integer of 1 or greater) of basis vectors.

KeyGen algorithm is an algorithm to generate a user secret key k*. KeyGen algorithm generates the user secret key k* using the basis B* included in the master secret key sk as indicated in Formula 1.

$$k^* := \sigma(v_1 b^*_1 + \ldots + v_n b^*_n) + b^*_{n+1}$$ <Formula 1>

Note that σ is a random number value. $v_1, \ldots, v_n$ are attribute information of a user who is provided with the user secret key k* and the like.

Enc algorithm is an algorithm to generate encrypted data c.

Enc algorithm generates an element $c_1$ of the encrypted data c using the basis B included in the public parameter pk as indicated in Formula 2.

$$c_1 := \omega(x_1 b_1 + \ldots + x_n b_n) + \zeta b_{n+1} + \phi b_{n+2}$$ <Formula 2>

Note that ω, ζ, φ are random number values. $x_1, \ldots, x_n$ are attribute information of a user who can decrypt the encrypted data c and the like.

Further, Enc algorithm generates an element $c_2$ of the encrypted data c using the parameter param included in the public parameter pk as indicated in Formula 3.

$$c_2 := e(g,g)^\zeta \cdot m$$ <Formula 3>

Note that g is information included in the parameter param and an element of a group G which constitutes the dual pairing vector spaces. m denotes a message. e(g, g) is a pairing operation of an element g and an element g.

Dec algorithm is an algorithm to decrypt the encrypted data c using the user secret key k*.

By Dec algorithm, the calculation indicated in Formula 4 is implemented, the encrypted data c is decrypted using the user secret key k*, and m' is extracted.

$$m' := c_2/e(c_1, k^*)$$ <Formula 4>

Note that $e(c_1, k^*)$ is a pairing operation of the element $c_1$ and the user secret key k*.

By Dec algorithm, if the attribute information and the like $(v_1, \ldots, v_n)$ which are set in the basis vectors $b^*_1, \ldots, b^*_n$ in the user secret key k* correspond to the attribute information and the like $(x_1, \ldots, x_n)$ which are set in the basis vectors $b_1, \ldots, b_n$ in the element $c_1$, the extracted m'=m.

That the attribute information and the like $(v_1, \ldots, v_n)$ correspond to the attribute information and the like $(x_1, \ldots, x_n)$ means $\Sigma_{i=1}^n v_i \cdot x_i = 0$.

The pairing operation is defined as $e(sg, tg) = e(g, g)^{st}$. Accordingly, $e(c_1, k^*) = e(g,g)^Y$. Note that $Y = \omega\sigma(x_1 \cdot v_1 + \ldots x_n \cdot v_n) + \zeta$. Therefore, if $\Sigma_{i=1}^n v_i \cdot x_i = 0$, then Y=ζ, and $e(c_1, k^*) = e(g,g)^\zeta$.

Since $c_2 = e(g,g)^\zeta \cdot m$ as indicated in Formula 3, if the calculation of Formula 4 is carried out, when $\Sigma_{i=1}^n v_i \cdot x_i = 0$, m'=m.

In the following explanation, assume that n=4 to facilitate the explanation.

FIG. 1 is a configuration diagram of a cryptographic processing system 10 related to the first embodiment.

The cryptographic processing system 10 implements cryptographic processing based on the functional encryption scheme described in Non-Patent Literatures 1 and 2 and the like. The cryptographic processing system 10 includes a plurality of user terminals 100, an encrypted data management device 200, an encrypted data storage device 300, and a key generation device 400. Respective user terminals 100, the encrypted data management device 200, the encrypted data storage device 300, and the key generation device 400 are connected via a network 500 such as the Internet and the like.

Figure 2:
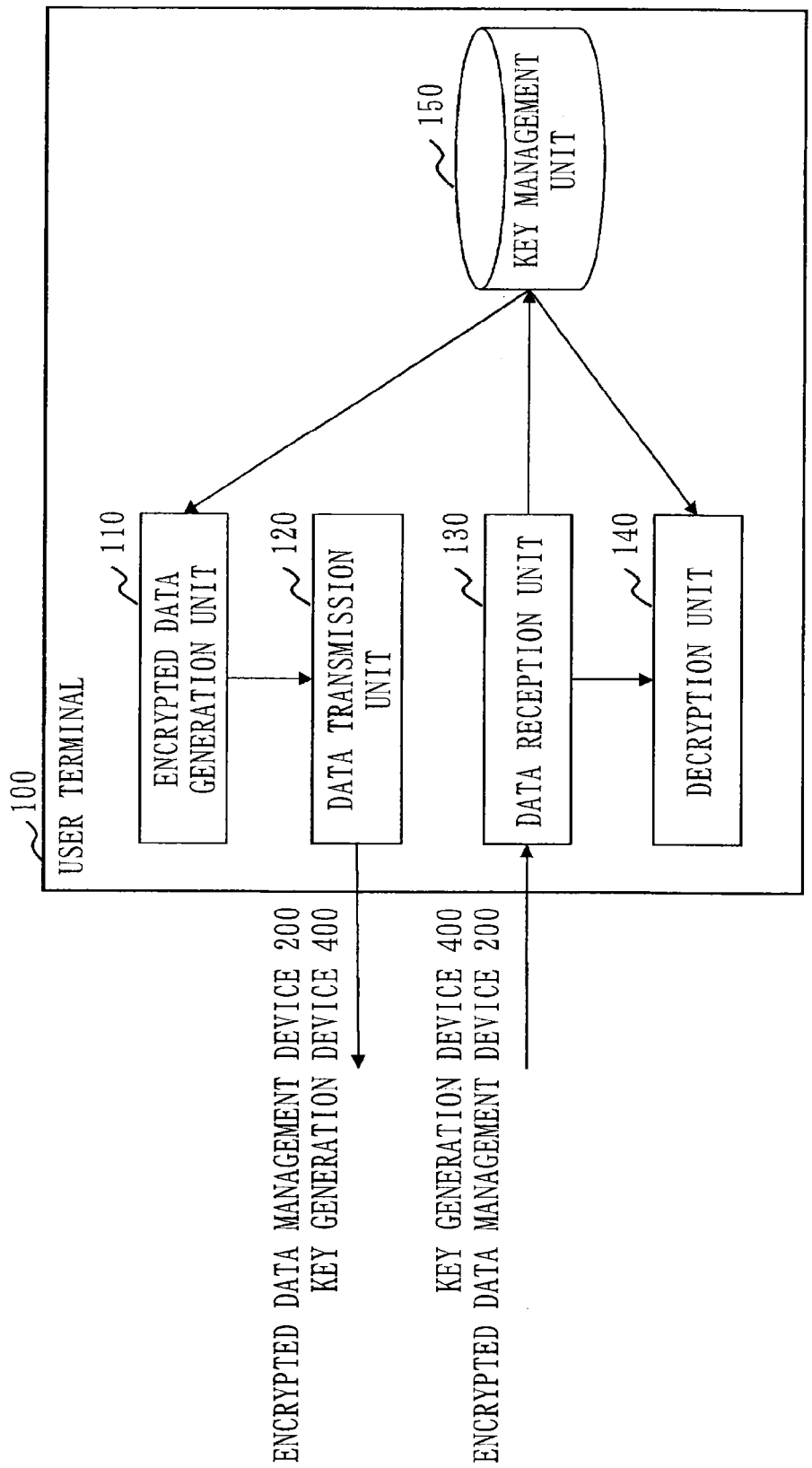
[FIG. 2] is a configuration diagram of a user terminal 100 related to the first embodiment.

FIG. 2 is a configuration diagram of the user terminal 100 related to the first embodiment.

The user terminal 100 is a terminal used by a user, which encrypts or decrypts data. The user terminal 100 includes an encrypted data generation unit 110, a data transmission unit 120, a data reception unit 130, a decryption unit 140, and a key management unit 150.

Figure 3:
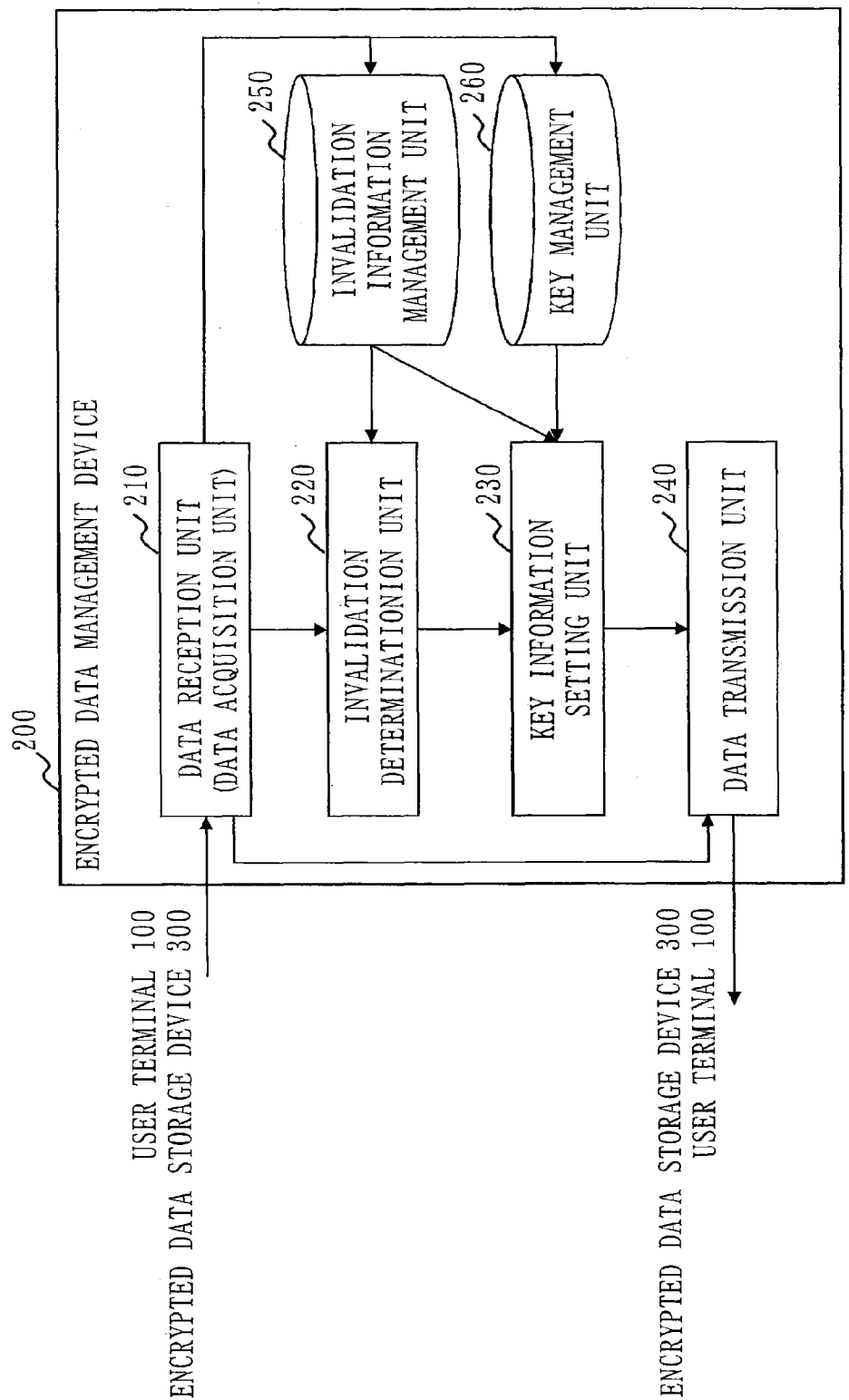
[FIG. 3] is a configuration diagram of an encrypted data management device 200 related to the first embodiment.

FIG. 3 is a configuration diagram of the encrypted data management device 200 related to the first embodiment.

The encrypted data management device 200 manages the encrypted data between the user terminal 100 and the encrypted data storage device 300. The encrypted data management device 200 includes a data reception unit 210 (data acquisition unit), an invalidation determination unit 220, a key information setting unit 230, a data transmission unit 240, an invalidation information management unit 250, and a key management unit 260.

Figure 4:
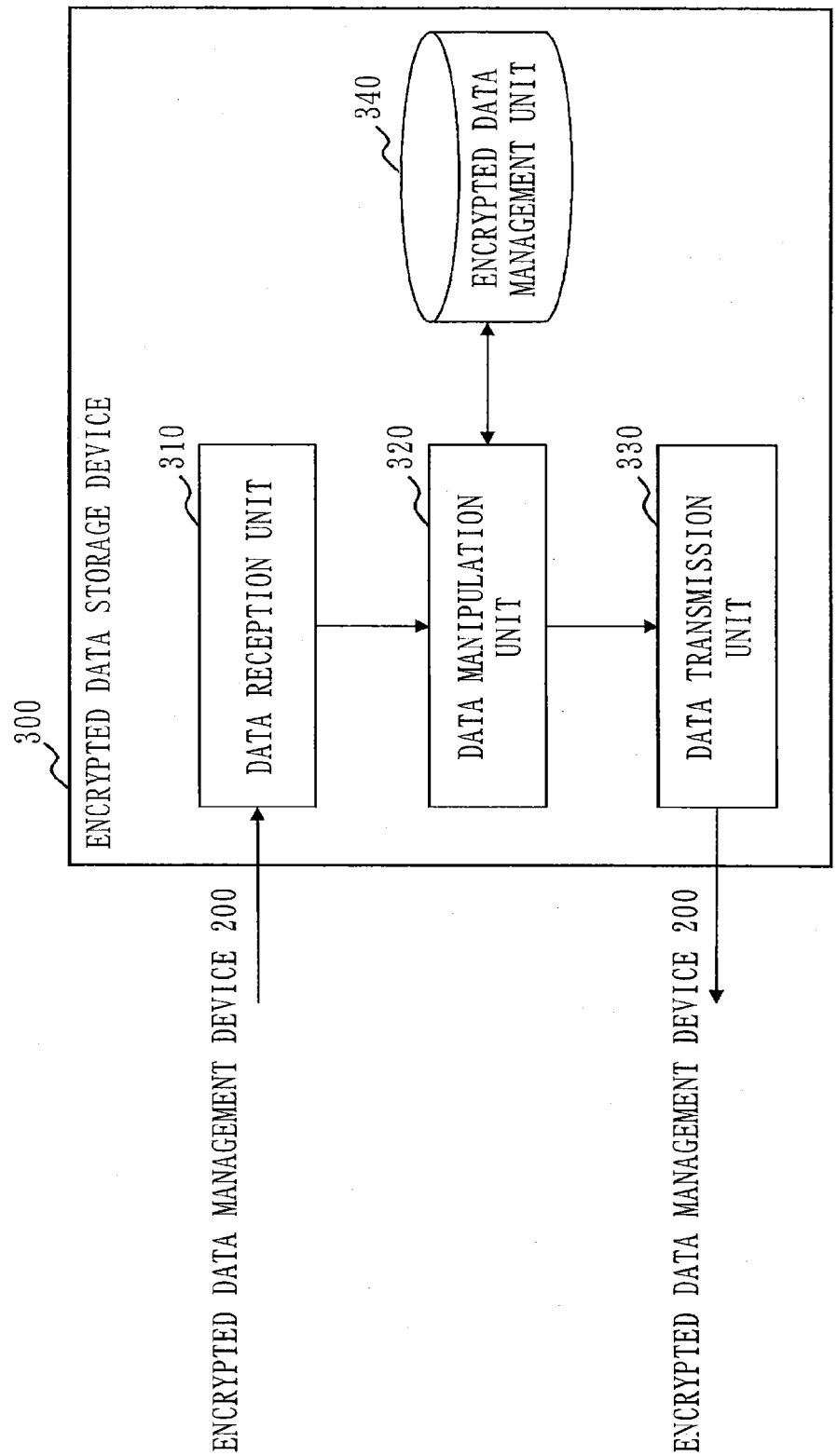
[FIG. 4] is a configuration diagram of an encrypted data storage device 300 related to the first embodiment.

FIG. 4 is a configuration diagram of the encrypted data storage device 300 related to the first embodiment.

The encrypted data storage device 300 stores encrypted data. The encrypted data storage device 300 includes a data reception unit 310, a data manipulation unit 320, a data transmission unit 330, and an encrypted data management unit 340.

Figure 5:
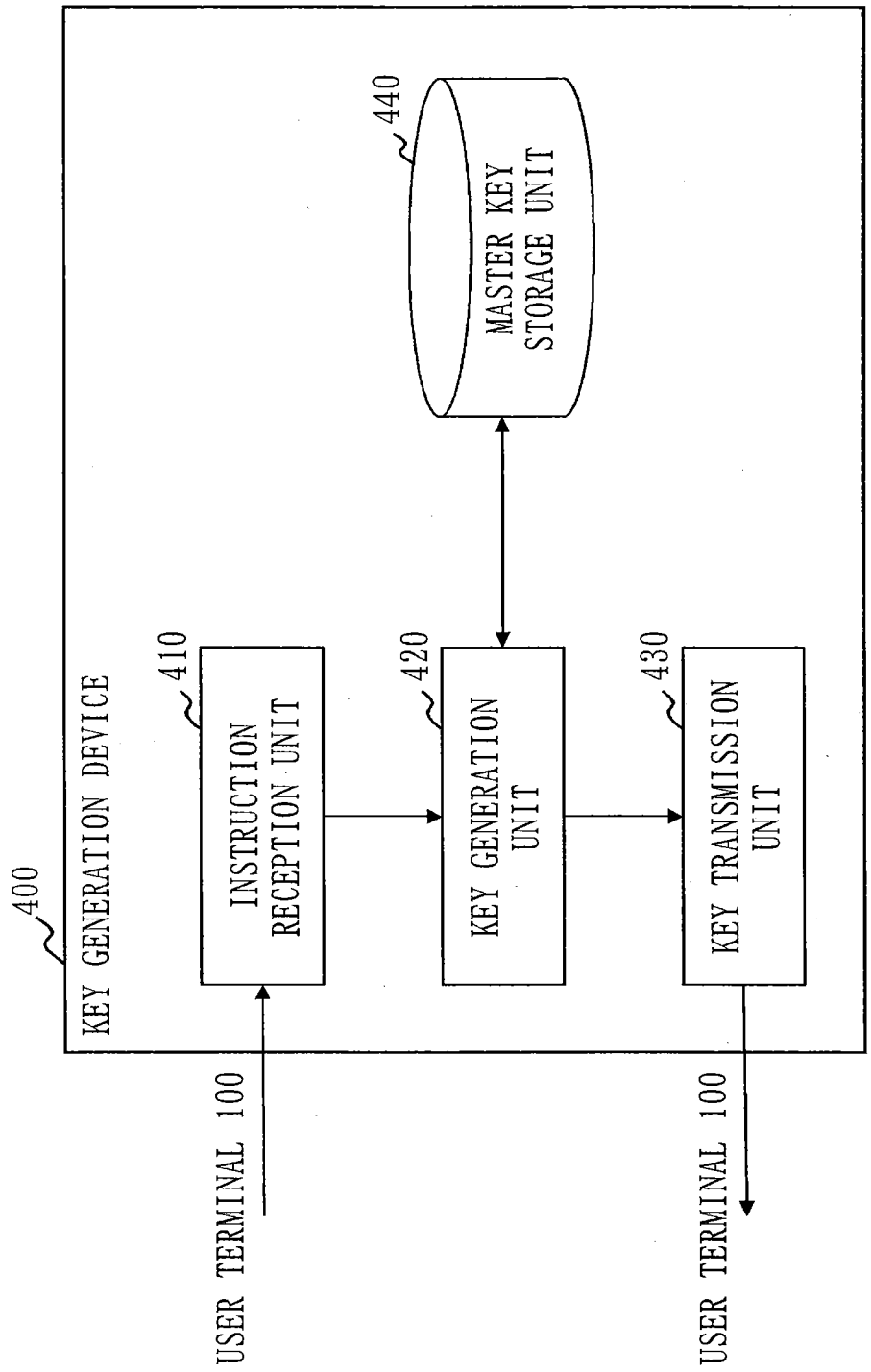
[FIG. 5] is a configuration diagram of a key generation device 400 related to the first embodiment.

FIG. 5 is a configuration diagram of the key generation device 400 related to the first embodiment.

The key generation device 400 generates the user secret key k*, the master secret key sk, and the public parameter pk. The key generation device 400 includes an instruction reception unit 410, a key generation unit 420, a key transmission unit 430, and a master key storage unit 440.

Main processes of the cryptographic processing system 10 are an encrypted data registration process and an encrypted data acquisition process. The encrypted data registration process is a process to register the encrypted data in the encrypted data storage device 300 by the user terminal 100. The encrypted data acquisition process is a process to acquire the encrypted data from the encrypted data storage device 300 by the user terminal 100.

There are three preconditions for the encrypted data registration process and the encrypted data acquisition process.

After explaining the three preconditions, the encrypted data registration process and the encrypted data acquisition process will be explained.

<Precondition 1>

The user terminal 100 has to acquire the user secret key k* of the functional encryption scheme.

The instruction reception unit 410 of the key generation device 400 receives an instruction to generate a key from the user terminal 100 and the like. Then, the key generation unit 420 of the key generation device 400, by the processing device, implements Setup algorithm, generates the public parameter pk and the master secret key sk, and stores them in the master key storage unit 440. Further, the key generation unit 420, by the processing device, implements KeyGen algorithm, generates the user secret key k* using the basis B* included in the master secret key sk.

Then, the key transmission unit 430 sends the public parameter pk and the user secret key k* to the user terminal 100. The data reception unit 130 of the user terminal 100 receives the public parameter pk and the user secret key k* and stores them in the key management unit 150. Further, the key transmission unit 430 sends the public parameter pk to the encrypted data management device 200. The data reception unit 210 of the encrypted data management device 200 receives the public parameter pk and stores it in the key management unit 260.

It is sufficient to implement Setup algorithm only once; there is no need to implement Setup algorithm at every generation of the user secret key k*.

When the key transmission unit 430 sends the user secret key k* to the user terminal 100, authentication of the user is carried out to check whether or not the user terminal 100 is a terminal of a correct user. Further, when the key transmission unit 430 sends the user secret key k* to the user terminal 100, a secure communication path employing SSL (Secure Socket Layer) and the like is used to prevent eavesdropping and falsification. That is, the user secret key k* is prevented from being used improperly by a malicious third party.

The key generation unit 420 generates the user secret key k* as indicated in Formula 5.

$$k^* = \sigma_1(v_1 b^*_1 + v_2 b^*_2) + \sigma_2(v_3 b^*_3 + v_4 b^*_4) + b^*_5 \qquad \text{<Formula 5>}$$

Note that $\sigma_1$ and $\sigma_2$ are random number values. $v_1$ and $v_2$ are key information. Here, as the key information, a generation number is employed, of which a value is incremented at every issuance of a new key. $v_3$ and $v_4$ are attribute information of the user who is provided with the user secret key k*.

If a value of the generation number is $\rho$ and a value of the attribute information is $\alpha$, the user secret key k* is generated as indicated in Formula 6.

$$k^* = \sigma_1(\rho b^*_1 + b^*_2) + \sigma_2(\alpha b^*_3 + b^*_4) + b^*_5 \qquad \text{<Formula 6>}$$

That is, $v_1 := \rho$, $v_2 := 1$, $v_3 := \alpha$, and $v_4 := 1$.

When generating a user secret key k* for a certain user for the first time, the key generation unit 420 sets 1 to a value of the generation number. When generating the user secret key k* again if the user has lost the user secret key k*, the value of the generation number is incremented to 2. After that, when generating the user secret key k* again if the user loses the user secret key k*, another incremented value of the generation number will be used.

<Precondition 2>

The user terminal 100 has to acquire a domain public key dpk.

The domain public key dpk is a public key corresponding to the secret key (a domain secret key dsk) of the encrypted data management device 200. Here, a key pair of the domain secret key dsk and the domain public key dpk does not need to be a key pair of the functional encryption scheme, but it can be a key pair of another public key cryptosystem.

The key generation unit 420 generates a key pair of the domain secret key dsk and the domain public key dpk, the key transmission unit 430 sends the domain public key dpk to the user terminal 100, and sends the domain secret key dsk to the encrypted data management device 200. The data reception unit 130 of the user terminal 100 receives the domain secret key dsk and stores it in the key management unit 150. Further, the data reception unit 210 of the encrypted data management device 200 receives the domain public key dpk and stores it in the key management unit 260.

When the key transmission unit 430 sends the domain secret key dsk to the encrypted data management device 200, a secure communication path employing SSL and the like is used to prevent eavesdropping and falsification.

<Precondition 3>

The encrypted data management device 200 has to acquire invalidation information.

The invalidation information is information showing identifying information of the user who has lost the user secret key k* and the generation number of the lost user secret key k*.

When the user has lost the user secret key k*, the data transmission unit 120 of the user terminal 100 sends the identifying information of the user who has lost the user secret key k* and the generation number of the lost user secret key k* as the invalidation information to the encrypted data management device 200. The data reception unit 210 of the encrypted data management device 200 receives the invalidation information and stores it in the invalidation information management unit 250.

Here, when receiving the invalidation information, the data reception unit 210 carries out the user authentication to confirm that the user who notifies of the invalidation is the user himself.

<Encrypted Data Registration Process>

Figure 6:
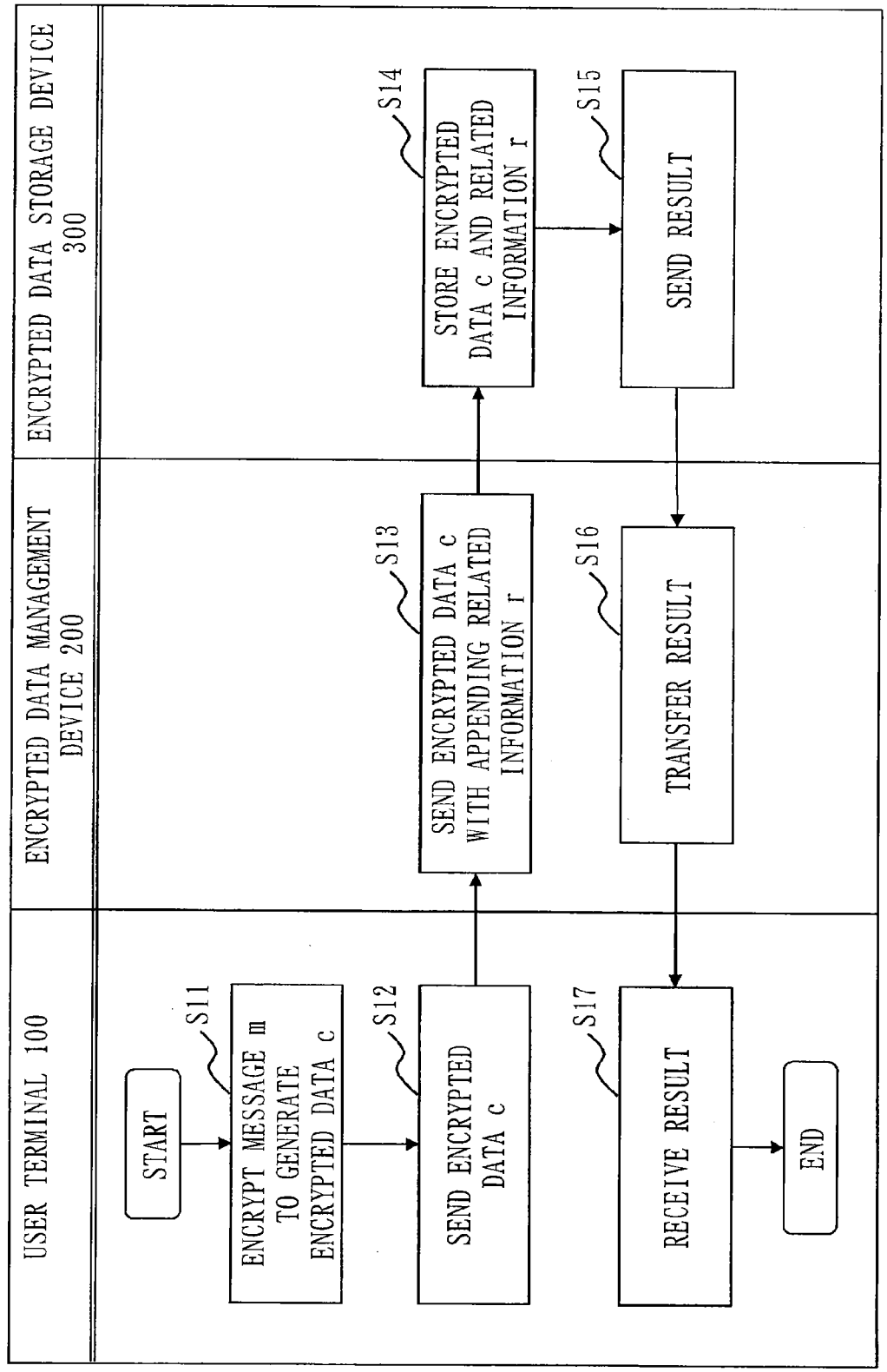
[FIG. 6] is a flowchart showing a flow of an encrypted data registration process related to the first embodiment.

FIG. 6 is a flowchart showing a flow of an encrypted data registration process related to the first embodiment.

(S11: Encryption Process)

The encrypted data generation unit 110 of the user terminal 100 implements Enc algorithm to generate encrypted data c.

The encrypted data generation unit 110 generates, by the processing device, an element $c_1$ of the encrypted data c using the basis B included in the public parameter pk stored in the key management unit 150 as indicated in Formula 7.

$$c_1 := \omega_1(r_1 b_1 + r_2 b_2) + \omega_2(x_3 b_3 + x_4 b_4) + \zeta b_5 + \phi b_6 \qquad \text{<Formula 7>}$$

Note that $\omega_1$, $\omega_2$, $r_1$, $r_2$, $\zeta$, and $\phi$ are random number values. $x_3$ and $x_4$ are attribute information of the user who can decrypt the encrypted data c.

Assuming the value of the attribute information is $\alpha$, the encrypted data c is generated as indicated in Formula 8.

$$c_1 := \omega_1(r_1 b_1 + r_2 b_2) + \omega_2(b_3 - \alpha b_4) + \zeta b_5 + \phi b_6 \qquad \text{<Formula 8>}$$

That is, $x_3 := 1$ and $x_4 := -\alpha$.

The encrypted data generation unit 110 generates, by the processing device, an element $c_2$ of the encrypted data c using the parameter param included in the public parameter pk stored in the key management unit 150 as indicated in Formula 9.

$$c_2 := e(g,g)^{\zeta} \cdot m \qquad \text{<Formula 9>}$$

The encrypted data generation unit 110 generates, by the processing device, $E(\omega_1 r_1)$ which is encrypted $\omega_1 r_1$ and $E(\omega_1 r_2)$ which is encrypted $\omega_1 r_2$ using the domain public key dpk stored in the key management unit 150.

Also, the encrypted data generation unit 110 generates a user list ul of the identifying information of the user shown by the attribute information set in the element $c_1$.

(S12: First Data Transmission Process)

The data transmission unit 120 of the user terminal 100 sends, by the communication device, the encrypted data c including the elements $c_1$, $c_2$, $E(\omega_1 r_1)$, $E(\omega_1 r_2)$, and ul generated by the encrypted data generation unit 110 to the encrypted data management device 200.

(S13: Second Data Transmission Process)

The data reception unit 210 of the encrypted data management device 200 receives, by the communication device, the encrypted data c from the user terminal 100. The data transmission unit 240 of the encrypted data management device 200 sends the encrypted data c with appending related information r to the encrypted data storage device 300. The related information r is information such as a creator of the encrypted data c, a reception date and time of the encrypted data c and the like, which will be used for searching the encrypted data c afterwards.

(S14: Data Storage Process)

The data reception unit 310 of the encrypted data storage device 300 receives, by the communication device, the encrypted data c and the related information r from the encrypted data management device 200. The data manipulation unit 320 of the encrypted data storage device 300 correlates the encrypted data c with the related information r and stores it in the encrypted data management unit 340.

(S15: Result Transmission Process)

The data transmission unit 330 of the encrypted data storage device 300 sends, by the communication device, result information showing if the storage of the encrypted data c succeeds or not to the encrypted data management device 200.

(S16: Result Transfer Process)

The data reception unit 210 of the encrypted data management device 200 receives, by the communication device, the result information from the encrypted data storage device 300. The data transmission unit 240 of the encrypted data management device 200 sends, by the communication device, the result information to the user terminal 100.

(S17: Result Reception Process)

The data reception unit 130 of the user terminal 100 receives, by the communication device, the result information from the encrypted data management device 200.

<Encrypted Data Acquisition Process>

Figure 7:
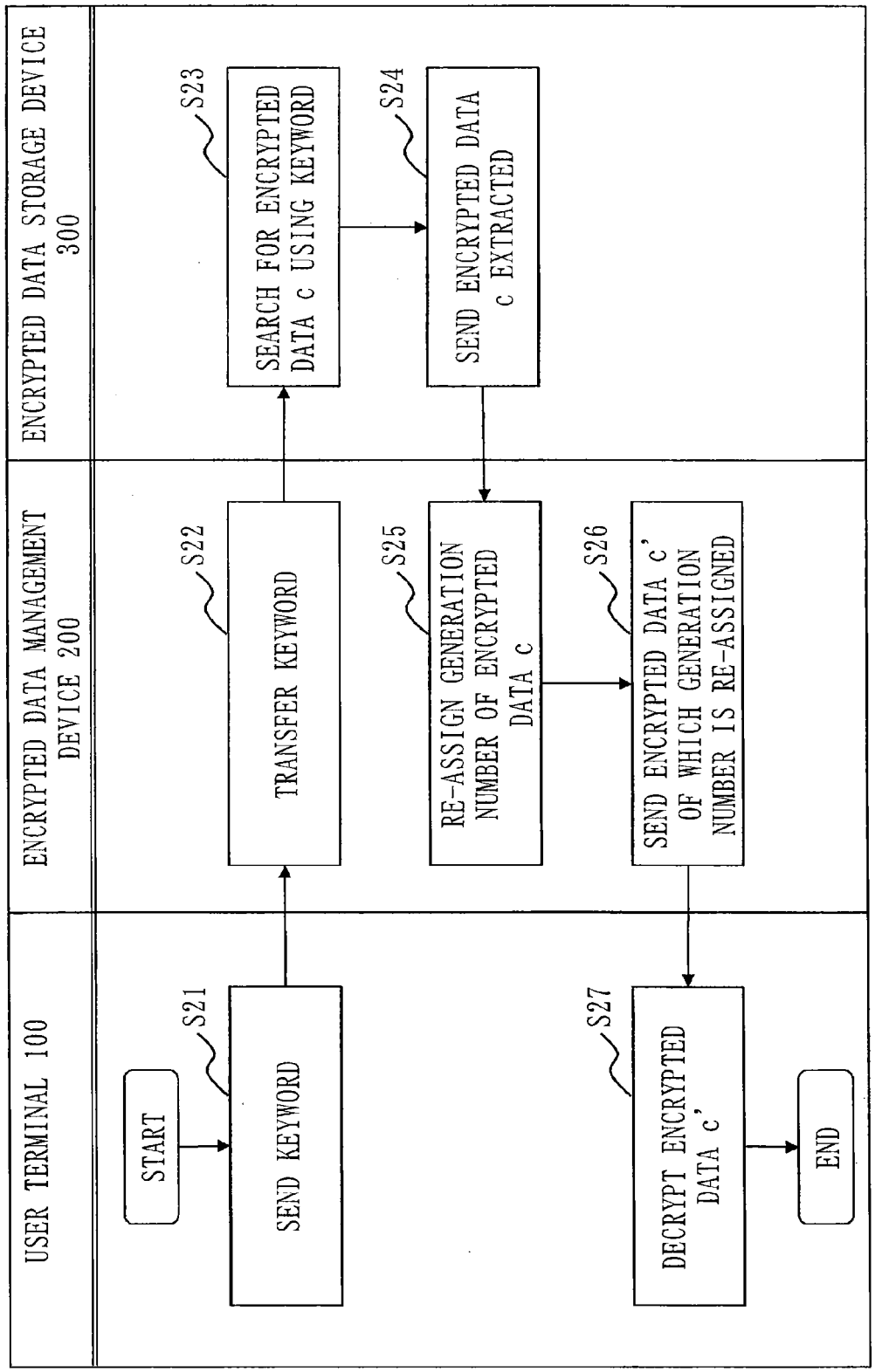
[FIG. 7] is a flowchart showing a flow of an encrypted data acquisition process related to the first embodiment.

FIG. 7 is a flowchart showing a flow of the encrypted data acquisition process related to the first embodiment.

(S21: Keyword Transmission Process)

The data transmission unit 120 of the user terminal 100 sends, by the communication device, a keyword which can specify the encrypted data c to the encrypted data management device 200.

(S22: Keyword Transfer Process)

The data reception unit 210 of the encrypted data management device 200 receives, by the communication device, the keyword from the user terminal 100. The data transmission unit 240 of the encrypted data management device 200 sends, by the communication device, the keyword to the encrypted data storage device 300.

(S23: Data Search Process)

The data reception unit 310 of the encrypted data storage device 300 receives, by the communication device, the keyword from the encrypted data management device 200. The data manipulation unit 320 of the encrypted data storage device 300 extracts, by the processing device, the encrypted data c having the related information r which matches the keyword from the encrypted data management unit 340.

(S24: First Data Transmission Process)

The data transmission unit 330 of the encrypted data storage device 300 sends, by the communication device, the extracted encrypted data c to the encrypted data management device 200.

(S25: Generation Number Re-Assignment Process)

The data reception unit 210 of the encrypted data management device 200 receives, by the communication device, the encrypted data c from the encrypted data storage device 300.

The invalidation determination unit 220 of the encrypted data management device 200 determines, by the processing device, whether or not the identifying information of the user included in the user list ul of the encrypted data c is included in the invalidation information stored in the invalidation information management unit 250. The key information setting unit 230 resets, by the processing device, the random number values $r_1$ and $r_2$ in the element $c_1$ of the encrypted data c to different values according to the determination result of the invalidation determination unit 220, and an element $c_1'$ is generated.

The key information setting unit 230 resets the random number values $r_1$ and $r_2$ specifically as shown below. Here, the element $c_1'$ is shown, of which the random number values $r_1$ and $r_2$ in the element $c_1$ indicated in Formula 8 are reset.

If the identifying information of the user included in the user list ul is not included in the invalidation information stored in the invalidation information management unit 250, the key information setting unit 230 generates the element $c_1'$ as indicated in Formula 10.

$$c_1' := \omega_1(b_1-b_2)+\omega_2(b_3-\alpha b_4)+\zeta b_5+\phi b_6 \qquad \text{<Formula 10>}$$

That is, $r_1$ is reset to 1, and $r_2$ is reset to −1. −1, by which $r_2$ is reset, is an initial value of −1×the generation number.

The calculation indicated in Formula 11 is implemented, thereby acquiring the element $c_1'$ indicated in Formula 10 from the element $c_1$ indicated in Formula 8.

$$c_1' := c_1 - (\omega_1 r_1 b_1 + \omega_1 r_2 b_2) + (\omega_1 b_1 - \omega_1 b_2) \qquad \text{<Formula 11>}$$

Note that $\omega_1 r_1$ and $\omega_1 r_2$ are acquired by decrypting the element $E(\omega_1 r_1)$ and $E(\omega_1 b_2)$ of the encrypted data c using the domain secret key dsk stored in the key management unit 260. $b_1$ and $b_2$ are acquired from the basis B included in the public parameter pk.

If the identifying information of the user included in the user list ul is included in the invalidation information stored in the invalidation information management unit 250, the key information setting unit 230 generates the element $c_1'$ as indicated in Formula 12.

$$c_1' := \omega_1(b_1-\rho_1 b_2)+\omega_2(b_3-\alpha b_4)+\zeta b_5+\phi b_6 \qquad \text{<Formula 12>}$$

That is, $r_1$ is reset to 1, and $r_2$ is reset to $-\rho_1$. $-\rho_1$ by which $r_2$ is reset is −1×(the value of the generation number of the invalid user secret key k*+1). That is, if the user A is included in the user list ul, and 1 is included in the invalidation list as the generation number of the user secret key k* of the invalid user A, $-\rho_1$ is −1×(1+1)=−2.

The calculation indicated in Formula 13 is implemented, thereby acquiring the element $c_1'$ indicated in Formula 12 from the element $c_1$ indicated in Formula 8.

$$c_1':=c_1-(\omega_1 r_1 b_1+\omega_1 r_2 b_2)+(\omega_1 b_1-\omega_1 \rho_1 b_2) \quad \text{<Formula 13>}$$

(S26: Second Data Transmission Process)

The data transmission unit 240 of the encrypted data management device 200 sends, by the communication device, the encrypted data c' in which the element $c_1$ of the encrypted data c is replaced with the element $c_1'$ to the user terminal 100.

(S27: Decryption Process)

The encrypted data generation unit 110 of the user terminal 100 receives, by the communication device, the encrypted data c' from the encrypted data management device 200. The decryption unit 140 of the user terminal 100 implements Dec algorithm, thereby decrypting the encrypted data c' using the user secret key k*.

The decryption unit 140 implements, by the processing device, the calculation indicated in Formula 14, thereby decrypting the encrypted data c' using the user secret key k* and extracting the message m'.

$$m':=c_2/e(c_1,k^*) \quad \text{<Formula 14>}$$

As discussed above, if the attribute information and the like $(v_1, \ldots, v_n)$ set in the basis vector $b^*_1, \ldots, b^*_n$ in the user secret key k* corresponds to the attribute information and the like $(x_1, \ldots, x_n)$ set in the element $c_1$ of the basis vector $b_1, \ldots, b_n$, the extracted m'=m. Here, that the attribute information and the like $(v_1, \ldots, v_n)$ corresponds to the attribute information and the like $(x_1, \ldots, x_n)$ means $\Sigma_{i=1}^n v_i \cdot x_i = 0$.

Assume that the user terminal 100 includes the user secret key k* which has been generated for the first time and to which 1 is appended as the value of the generation number. That is, the user terminal 100 includes the user secret key k* indicated in Formula 15 in which 1 is set to ρ of Formula 6.

$$k^*=\sigma_1(b^*_1+b^*_2)+\sigma_2(\alpha b^*_3+b^*_4)+b^*_5 \quad \text{<Formula 15>}$$

Also, assume that, at S11, the element $c_1$ of the encrypted data c is generated as indicated in Formula 16 (=Formula 8).

$$c_1:=\omega_1(r_1 b_1+r_2 b_2)+\omega_2(b_3-\alpha b_4)+\zeta b_5+\phi b_6 \quad \text{<Formula 16>}$$

If the identifying information of the user included in the user list ul is not included in the invalidation information, the element $c_1'$ is generated as indicated in Formula 17 (=Formula 10).

$$c_1':=\omega_1(b_1-b_2)+\omega_2(b_3-\alpha b_4)+\zeta b_5+\phi b_5 \quad \text{<Formula 17>}$$

In this case, $v_1=1$, $v_2=1$, $v_3=\alpha$, $v_4=1$, and $x_1=1$, $x_2=-1$, $x_3=1$, $x_4=-\alpha$, so that $\Sigma_{i=1}^4 v_i \cdot x_i = 1-1+\alpha-\alpha=0$. Therefore, the message m' extracted at S26 is equal to the message m set in the element $c_2$ of the encrypted data c at S11.

That is, the encrypted data c can be decrypted by the user secret key k*.

On the other hand, if the identifying information of the user included in the user list ul is included in the invalidation information, the element $c_1'$ is generated as indicated in Formula 18. Assume that the user secret key k* of which value of the generation number is 1 is invalid.

$$c_1':=\omega_1(b_1-2b_2)+\omega_2(b_3-\alpha b_4)+\zeta b_5+\phi b_6 \quad \text{<Formula 18>}$$

In this case, in the user secret key k*, $v_1, \ldots, v_4$ set in the coefficient of the basis vector $b^*_1, \ldots, b^*_4$ are $v_1=1$, $v_2=1$, $v_3=\alpha$, $v_4=1$. Also, in the element $c_1'$, $x_1, \ldots, x_4$ set in the coefficient of the basis vector $b_1, \ldots, b_4$ are $x_1=1$, $x_2=-2$, $x_3=1$, $x_4=-\alpha$, so that $\Sigma_{i=1}^4 v_i \cdot x_i=1-2+\alpha-\alpha\neq 0$. Therefore, the message m' extracted at S26 is not equal to the message m set in the element $c_2$ of the encrypted data c at S11.

That is, the encrypted data c cannot be decrypted by the invalid user secret key k*.

However, assume that the user terminal 100 asks the key generation device 400 to generate the user secret key k* again, and a user secret key k* to which 2 is assigned as the value of the generation number is acquired. That is, the user terminal 100 acquires the user secret key k* indicated in Formula 19 in which 2 is set to ρ of Formula 6.

$$k^*=\sigma_1(2b^*_1+b^*_2)+\sigma_2(\alpha b^*_3+b^*_4)+b^*_5 \quad \text{<Formula 19>}$$

In this case, $v_1=2$, $v_2=1$, $v_3=\alpha$, $v_4=1$, and $x_1=1$, $x_2=-2$, $x_3=1$, $x_4=-\alpha$, so that $\Sigma_{i=1}^4 v_i \cdot x_i=2-2+\alpha-\alpha=0$. Therefore, the message m' extracted at S26 is equal to the message m set in the element $c_2$ of the encrypted data c at S11.

That is, even if the user secret key k* is lost, the user secret key k* is generated again, and thereby the encrypted data c can be decrypted.

Alternatively, it is also considered that the user terminal 100 acquires, without via the encrypted data management device 200, the encrypted data c from the encrypted data storage device 300. However, in this case, the element $c_1$ of the encrypted data c is as indicated in Formula 20 (=Formula 8).

$$c_1:=\omega_1(r_1 b_1+r_2 b_2)+\omega_2(b_3-\alpha b_4)+\zeta b_5+\phi b_6 \quad \text{<Formula 20>}$$

Since the random number values $r_1$ and $r_2$ are used, whatever the value of the generation number set in the user secret key k* is, $\Sigma_{i=1}^4 v_i \cdot x_i \neq 0$, and the decryption cannot be done.

As discussed above, the cryptographic processing system 10 related to the first embodiment can set the status, when the user secret key k* is lost, the encrypted data c cannot be decrypted using the lost user secret key k*, but the encrypted data c can be decrypted by the user secret key k* that has been re-generated. In particular, at this time, it is unnecessary to carry out the processing such as re-encryption and the like for the encrypted data c that has been already stored in the encrypted data storage device 300.

Also, in the cryptographic processing system 10 related to the first embodiment, even if the user terminal 100 acquires, without via the encrypted data management device 200, the encrypted data c from the encrypted data storage device 300, the encrypted data c cannot be decrypted.

Therefore, in the cryptographic processing system 10 related to the first embodiment, even if the encrypted data storage device 300 is delegated to the third party and there is a possibility to leak the encrypted data c from the encrypted data storage device 300, the security can be maintained.

That is, in the cryptographic processing system 10 related to the first embodiment, the attribute information of the user and the generation number of the key are set in the user secret key k*. Also, as conditions for decrypting, the condition of the attribute information of the user who can decrypt the data and the condition of the generation number of the key which can decrypt the data are set as AND condition in the encrypted data c.

Further, the cryptographic processing system 10 related to the first embodiment is provided with the encrypted data management device 200 which relays the processes between the user terminal 100 and the encrypted data storage device 300. Then, when the user terminal 100 acquires the encrypted data c, the encrypted data management device 200 acquires the encrypted data c from the encrypted data storage device 300 and sends the encrypted data c to the user terminal 100. At this time, the encrypted data management device 200 resets the generation number of the encrypted data c to a different value based on whether or not a user whose user secret key k* is invalid is included in the users who can decrypt the encrypted data c. Specifically, if the invalid user is not included, the initial value is set to the generation number; and if the invalid user is included, a value of a valid generation number is set to the generation number.

As discussed, in the cryptographic processing system 10 related to the first embodiment, without re-encrypting the encrypted data c, the encrypted data c cannot be decrypted by the lost user secret key k*, but the encrypted data c can be decrypted by the re-generated user secret key k*.

In the above explanation, the user secret key k* is generated as indicated in Formula 5. That is, different random number values $\sigma_1$ and $\sigma_2$ are respectively multiplied to the key information and the attribute information. However, the same random number value $\sigma$ can be multiplied to the key information and the attribute information as indicated in Formula 21 to generate the user secret key k*.

$$k^* = \sigma(v_1 b^*_1 + v_2 b^*_2 + v_3 b^*_3 + v_4 b^*_4) + b^*_5 \quad \text{<Formula 21>}$$

Also, in the above explanation, the element $c_1$ of the encrypted data c is generated as indicated in Formula 7. That is, different random number values $\omega_1$ and $\omega_2$ are multiplied respectively to the key information and the attribute information. However, the same random number value $\omega$ can be multiplied to the key information and the attribute information as indicated in Formula 22 to generate the element $c_1$.

$$c_1 := \omega(r_1 b_1 + r_2 b_2 + x_3 b_3 + x_4 b_4) + \zeta b_5 + \phi b_6 \quad \text{<Formula 22>}$$

Also, the element $c_1$ can be generated without using the random number value $\omega_1$ as indicated in Formula 23. This is because $r_1$ and $r_2$ are the random number values, it is unnecessary to be multiplied further by the random number value.

$$c_1 := r_1 b_1 + r_2 b_2 + \omega_2(x_3 b_3 + x_4 b_4) + \zeta b_5 + \phi b_6 \quad \text{<Formula 23>}$$

Also, the coefficient of a part of the basis vectors ($b_1$ in Formula 24) which set the key information is set to 0 to generate the element $c_1$ as indicated in Formula 24. This is because the values of the basis vectors $b_1$ and $b_2$ are re-assigned by the encrypted data management device 200, it is sufficient to set the random number value to either of the coefficients of the basis vectors.

$$c_1 := r_2 b_2 + \omega_2(x_3 b_3 + x_4 b_4) + \zeta b_5 + \phi b_6 \quad \text{<Formula 24>}$$

Also, without setting the random number value to the basis vector which sets the key information, other parts can be encrypted by the domain public key to generate the element $c_1$ as indicated in Formula 25. By setting the random number value to the basis vector which sets the key information, the encrypted data c cannot be decrypted when the user terminal 100 tries to acquire the encrypted data c directly from the encrypted data storage device 300. However, similar effect can be obtained by encrypting the other parts using the domain public key.

$$c_1 := E(\omega_2(x_3 b_3 + x_4 b_4) + \zeta b_5 + \phi b_6) \quad \text{<Formula 25>}$$

Further, in the above explanation, the user secret key k* and the encrypted data c, in which $\alpha$ is set to the value of the attribute information, are used to facilitate the explanation.

However, in fact, there is a case where the user secret key k*, in which $\alpha_1$ showing A Company, $\alpha_2$ showing B Department, and $\alpha_3$ showing C Section to which the user U belongs, and $\alpha_4$ showing the user U are set to the values of the attribute information, is used. For instance, the user secret key k* indicated in Formula 26 is used. Note that 1 is set to the value of the generation number. Also, in this case, n=10.

$$k^* = \sigma_1(b^*_1 + b^*_2) + \sigma_2(\alpha_1 b^*_3 + b_4 + \alpha_2 b_5 + b^*_6 + \alpha_3 b^*_7 + b^*_8 + \alpha_4 b_9 + b^*_{10}) + b_{11} \quad \text{<Formula 26>}$$

Further, there is a case where in order that any user belonging to B Department of A Company can decrypt the data, the encrypted data c in which $\alpha_1$ showing A Company and $\alpha_2$ showing B Department are set as the values of the attribute information is used. For instance, the encrypted data c indicated in Formula 27 is used.

$$c_1 := \omega_1(r_1 b_1 + r_2 b_2) + \omega_2(b_3 - \alpha_1 b_4 + b_5 - \alpha_2 b_6) + \zeta b_{11} + \phi b_{12} \quad \text{<Formula 27>}$$

If the identifying information of the user included in the user list ul is not included in the invalidation information, the element c1' is generated as indicated in Formula 28.

$$c_1 := \omega_1(b_1 - b_2) + \omega_2(b_3 - \alpha_1 b_4 + b_5 - \alpha_2 b_6) + \zeta b_{11} + \phi b_{12} \quad \text{<Formula 28>}$$

In this case, $v_1=1, v_2=1, v_3=\alpha_1, v_4=1, v_5=\alpha_2, v_6=1, v_7=\alpha_3, v_8=1, v_9=\alpha_4, v_{10}=1$, and $x_1=1, x_2=-1, x_3=1, x_4=-\alpha_1, x_5=1, x_6=-\alpha_2, x_7=0, x_8=0, x_9=0, x_{10}=0$, so that $\Sigma_{i=1}^{10} v_i \cdot x_i = \sigma_1 \omega_1(1-1) + \sigma_2 \omega_2(\alpha_1 - \alpha_1 + \alpha_2 - \alpha_2 + 0 + 0 + 0) = 0$. Therefore, the message m' extracted at S26 is equal to the message m set in the element $c_2$ of the encrypted data c at S11.

On the other hand, the identifying information of the user included in the user list ul is included in the invalidation information, the element $c_1'$ is generated as indicated in Formula 29. Assume that the user secret key k* of which the value of the generation number is 1 is invalid.

$$c_1 := \omega_1(b_1 - 2b_2) + \omega_2(b_3 - \alpha_1 b_4 + b_5 - \alpha_2 b_6) + \zeta b_{11} + \phi b_{12} \quad \text{<Formula 29>}$$

If one user $U_1$ belonging to B Department loses the user secret key k*, when another user $U_2$ belonging to B Department tries to acquire the encrypted data c, the element $c_1$ is converted not to the element $c_1'$ indicated in Formula 28 but the element $c_1'$ indicated in Formula 29. Therefore, not only the user $U_1$, but also the other users belonging to B Department such as the user $U_2$ and the like cannot decrypt the encrypted data c unless the user secret key k* is re-generated.

Embodiment 2.

In the second embodiment, in the functional encryption scheme described in Non-Patent Literature 2, a method to implement invalidation scheme of the secret key will be explained.

First, the functional encryption scheme described in Non-Patent Literature 2 will be explained with simplifying the explanation to only a part necessary for explaining the present embodiment. In particular, explanation of a span program, secret distribution and the like used in the functional encryption scheme described in Non-Patent Literature 2 is omitted or simplified.

The functional encryption scheme described in Non-Patent Literature 2 includes, as well as the functional encryption scheme described in Non-Patent Literature 1, Setup algorithm, KeyGen algorithm, Enc algorithm, and Dec algorithm.

Setup algorithm is an algorithm to generate a public parameter pk and a master secret key sk.

By Setup algorithm, a parameter param of dual pairing vector spaces and a basis $B_t$ and a basis $B^*_t$ which are orthonormal basis for each t of t=0, . . . , d (d being an integer of 1 or greater) are generated. Then, the parameter param and the basis $B_t$ are set as the public parameter pk, and the basis $B^*_t$ is set as the master secret key sk.

The basis $B_0$ includes basis vectors $b_{0,1}, b_{0,2}, \ldots, b_{0,5}$, and the basis $B^*_0$ includes basis vectors $b^*_{0,1}, b^*_{0,2}, \ldots, b^*_{0,5}$. That is, the basis $B_0$ and $B^*_0$ include five basis vectors, respectively. Also, the basis $B_t$ for each t of t=1, . . . , d includes basis vectors $b_{t,1}, b_{t,2}, \ldots, b_{t,3nt+1}$, and the basis $B^*_t$ includes basis vectors $b^*_{t,1}, b^*_{t,2}, \ldots, b^*_{t,3nt+1}$. That is, the basis $B_t$ and $B^*_t$ include 3 nt+1 (nt being an integer of 1 or greater) number of the basis vectors, respectively.

However, strictly speaking, it is unnecessary to include the basis vector to which 0 is always assigned as the coefficient in the public parameter pk or the master secret key sk. Accordingly, the basis $B_0$ to be included in the public parameter pk can include only the basis vectors $b_{0,1}, b_{0,3}, b_{0,5}$, the basis $B^*_0$ to be included in the master secret key sk can include only the basis vectors $b^*_{0,1}, b^*_{0,3}, b^*_{0,4}$. Further, for each t of t=1, ..., d, the basis $B_t$ to be included in the public parameter pk can include only the basis vectors $b_{t,1}, \ldots, b_{t,nt}, b_{t,3nt+1}$, and the basis $B^*_t$ to be included in the master secret key sk can include only the basis vectors $b^*_{t,1}, \ldots, b^*_{t,nt+1}, b^*_{t,2nt+1}, \ldots, b^*_{t,3nt}$ KeyGen algorithm is an algorithm to generate a user secret key $k^*$.

By KeyGen algorithm, as indicated in Formula 30, using the basis $B^*_t$ included in the master secret key sk, the user secret key $k^*$ including an element $k^*_0$ and element $k^*_t$ for each t of t=1, ..., d is generated.

$$k^*_0 := (\delta, 0, 1, \phi_0, 0) B^*_0$$

$$k^*_t := (\delta \vec{v}_t, 0^{nt}, \vec{\phi}_t, 0) B^*_t \qquad \text{<Formula 30>}$$

Note that $\delta, \phi_0, \vec{\phi}_t := \phi_{t,1}, \ldots, \phi_{t,nt}$ are random number values, respectively. $\vec{v}_t := v_{t,1}, \ldots, v_{t,nt}$ are the attribute information and the like of the user who is provided with the user secret key $k^*$.

Also, $(z_1, \ldots, z_N) B^*_t := \Sigma_{i=1}^N z_i b^*_{t,i}$. That is, $k^*_0 := (\delta, 0, 1, \phi_0, 0) B^*_0 := \delta b^*_{0,1} + b^*_{0,3} + \phi_0 b^*_{0,4}$. Also, $k^*_t := (\delta \vec{v}_t, 0^{nt}, \vec{\phi}_t, 0) B^*_t := \Sigma_{i=1}^{nt} \delta v_{t,i} b^*_{t,i} + \Sigma_{i=1}^{nt} \phi_{t,i} b^*_{t,2nt+i}$.

Enc algorithm is an algorithm to generate an encrypted data c.

By Enc algorithm, as indicated in Formula 31, an element $c_0$ and an element $c_t$ for each t of t=1, ..., L (L being an integer of d or smaller) of the encrypted data c are generated using the basis B included in the public parameter pk.

$$c_0 := (-s_0, 0, \zeta, 0, \eta_0) B_0$$

$$c_t := (s_t \vec{e}_{t,1} + \theta_t \vec{x}_t, 0^{nt}, 0^{nt}, \eta_t) B_t \qquad \text{<Formula 31>}$$

Note that $\vec{e}_{t,1}$ denotes a vector having nt number of elements of which the initial element is 1 and the other elements are 0. Further, $s_0 = \Sigma_{i=1}^L s_i$. $\zeta, \theta_t, \eta_0, \eta_t$ are random number values. $x_{t,1}, \ldots, x_{t,nt}$ are the attribute information of the user who can decrypt the encrypted data c and the like.

Further, $(z_1, \ldots, z_N) B_t := \Sigma_{i=1}^N z_i b_{t,i}$. That is, $c_0 := (-s_0, 0, \zeta, 0, \eta_0) B_0 := -s_0 b_{0,1} + \zeta b_{0,3} + \eta_0 b_{0,5}$. Further, $c_t := (s_t \vec{e}_{t,1} + \theta_t \vec{x}_t, 0^{nt}, 0^{nt}, \eta_t) B_t := \Sigma_{i=1}^{nt} (s_t e_{t,1} + \theta_t x_{t,i}) b_{t,i} + \eta_t b_{3nt+1}$.

Further, by Enc algorithm, as indicated in Formula 32, an element $c_{d+1}$ of the encrypted data c is generated using the parameter param included in the public parameter pk.

$$c_{d+1} := e(g,g)^\zeta \cdot m \qquad \text{<Formula 32>}$$

Here, g denotes information included in the parameter param and is an element of a group G which constitutes the dual pairing vector spaces. m shows a message. e(g, g) denotes a pairing operation of the element g and the element g.

Dec algorithm is an algorithm to decrypt the encrypted data c using the user secret key $k^*$.

By Dec algorithm, the calculation indicated in Formula 33 is implemented, the encrypted data c is decrypted using the user secret key $k^*$, and m' is extracted.

$$m' := c_{d+1} / (e(c_0, k^*_0) \cdot \Pi_{t=1}^L e(c_t, k^*_t)) \qquad \text{<Formula 33>}$$

Here, $e(c_0, k^*_0)$ denotes a pairing operation of the element $c_0$ and the user secret key $k^*_0$, and $e(c_t, k^*_t)$ denotes a pairing operation of the element $c_t$ and the user secret key $k^*_t$.

By Dec algorithm, for each t of t=1, ..., L, if the attribute information and the like ($\vec{v}_t$) set in the element $k^*_t$ of the user secret key $k^*$ corresponds to the attribute information and the like ($\vec{x}_t$) set in the element $c_t$ of the encrypted data c, the extracted m'=m.

That the attribute information and the like ($\vec{v}_t$) corresponds to the attribute information and the like ($\vec{x}_t$) means $\vec{v}_t \cdot \vec{x}_t = \Sigma_{i=1}^{nt} v_{t,i} \cdot x_{t,i} = 0$ is satisfied.

The pairing operation is defined as $e(sg, tg) = e(g, g)^{st}$. Accordingly, $e(c_0, k^*_0) = e(g, g)^{Y1}$. Note that $Y1 = -s_0 + \zeta$. Also, $\Pi_{t=1}^L e(c_t, k^*_t) = (g, g)^{Y2}$. Note that $Y2 = \Sigma_{i=1}^L (s_{i+v_t} \cdot \vec{x}_t) = \Sigma_{i=1}^L (s_i) + \Sigma_{i=1}^L \vec{v}_i \cdot \vec{x}_i$. Therefore, if $\Sigma_{i=1}^L \vec{v}_i \cdot \vec{x}_i = 0$, $Y2 = \Sigma_{i=1}^L (s_i)$.

Then, if $e(c_0, k^*_0) \Pi_{t=1}^L e(c_t, k^*_t) = e(g, g)^{Y3}$ and $\Sigma_{i=1}^L \vec{v}_i \cdot \vec{x}_i = 0$, $Y3 = -s_0 + \zeta + \Sigma_{i=1}^L (s_i)$. Then, as discussed above, $s_0 = \Sigma_{i=1}^L s_i$, so that $Y3 = \zeta$. That is, $e(c_0, k^*_0) \cdot \Pi_{t=1}^L e(c_t, k^*_t) = e(g, g)^\zeta$.

As indicated in Formula 32, since $c_{d+1} := e(g, g)^\zeta \cdot m$, if the calculation of Formula 33 is carried out, when $\Sigma_{i=1}^L \vec{v}_i \cdot \vec{x}_i = 0$, m'=m is satisfied.

In the following, assume that d=2, L=2, n1=2, and n2=2 to facilitate the explanation.

The configuration of a cryptographic processing system 10 related to the second embodiment is the same as the cryptographic processing system 10 related to the first embodiment shown in FIG. 1. The configuration of a user terminal 100, a encrypted data management device 200, an encrypted data storage device 300, and a key generation device 400 related to the second embodiment is the same as the configuration of the user terminal 100, the encrypted data management device 200, the encrypted data storage device 300, and the key generation device 400 related to the first embodiment shown in FIGS. 2 to 5.

Main processes of the cryptographic processing system 10 related to the second embodiment include, similarly to the cryptographic processing system 10 related to the first embodiment, an encrypted data registration process and an encrypted data acquisition process; and the encrypted data registration process and the encrypted data acquisition process have three preconditions.

The three preconditions are the same as ones of the first embodiment except for the configuration of the user secret key $k^*$ generated at the precondition 1.

A key generation unit 420 generates a user secret key $k^*$ as indicated in Formula 34.

$$k^*_0 := (\delta, 0, 1, \phi_0, 0) B^*_0$$

$$k^*_1 := (\delta \vec{v}_1, 0^{n1}, \vec{\phi}_1, 0) B^*_1$$

$$k^*_2 := (\delta \vec{v}_2, 0^{n2}, \vec{\phi}_2, 0) B^*_2 \qquad \text{<Formula 34>}$$

Here, $\delta, \phi_0, \vec{\phi}_1, \vec{\phi}_2$ are random number values. $\vec{v}_1 := v_{1,1}, v_{1,2}$ are key information. In this formula, similarly to the first embodiment, a generation number of which a value is incremented at every issuance of a new key is used as the key information. $\vec{v}_2 := v_{2,1}, v_{2,2}$ denotes the attribute information and the like of the user who is provided with the user secret key $k^*$.

Assuming that a value of the generation number is $\rho$ and a value of the attribute information is $\alpha$, the user secret key $k^*$ is generated as indicated in Formula 35.

$$k^*_0 := (\delta, 0, 1, \phi_0, 0) B^*_0$$

$$k^*_1 := (\delta(\rho, 1), 0^{n1}, \vec{\phi}_1, 0) B^*_1$$

$$k^*_2 := (\delta(\alpha, 1), 0^{n2}, \vec{\phi}_2, 0) B^*_2 \qquad \text{<Formula 35>}$$

That is, $v_{1,1} := \rho, v_{1,2} := 1, v_{2,1} := \alpha$, and $v_{2,2} := 1$.

<Encrypted Data Registration Process>

With reference to FIG. 6, the encrypted data registration process related to the second embodiment will be explained, with focusing on a part being different from the encrypted data registration process related to the first embodiment.

(S11: Encryption Process)

An encrypted data generation unit 110 of the user terminal 100 implements Enc algorithm and generates encrypted data c.

The encrypted data generation unit 110 generates, by the processing device, elements $c_0$, $c_1$, and $c_2$ of the encrypted data c using a basis B included in a public parameter pk stored in a key management unit 150 as indicated in Formula 36.

$$c_0 := (-s_0, 0, \zeta, 0, \eta_0) B_0$$

$$c_1 := (s_1 \vec{e}_{1,1} + \theta_1(1,r), 0^{n_1}, 0^{n_1}, \eta_1) B_1$$

$$c_2 := (s_2 \vec{e}_{2,1} + \theta_2 \vec{x}_2, 0^{n_2}, 0^{n_2}, \eta_2) B_2 \qquad \text{<Formula 36>}$$

Note that $s_0 = s_1 + s_2$, $\zeta$, $\theta_1$, $\theta_2$, $\eta_0$, $\eta_1$, $\eta_2$, r are random number values. $x_{2,1}$ and $x_{2,2}$ are attribute information of a user who can decrypt the encrypted data c and the like.

Assuming that the value of the attribute information is $\alpha$, the encrypted data c is generated as indicated in Formula 37.

$$c_0 := (-s_0, 0, \zeta, 0, \eta_0) B_0$$

$$c_1 := (s_1 \vec{e}_{1,1} + \theta_1(1,r), 0^{n_1}, 0^{n_1}, \eta_1) B_1$$

$$c_2 := (s_2 \vec{e}_{2,1} + \theta_2(1,-\alpha), 0^{n_2}, 0^{n_2}, \eta_2) B_2 \qquad \text{<Formula 37>}$$

That is, $x_{2,1} := 1$ and $x_{2,2} := -\alpha$.

Further, the encrypted data generation unit 110, by the processing device, generates an element $c_{d+1}$ of the encrypted data c using the parameter param included in the public parameter pk stored in the key management unit 150 as indicated in Formula 38.

$$c_{d+1} := e(g,g)^\zeta \cdot m \qquad \text{<Formula 38>}$$

Further, the encrypted data generation unit 110 generates, by the processing device, E(r) which is encrypted r and E($\theta_1$) which is encrypted $\theta_1$ using a domain public key dpk stored in the key management unit 150.

Further, the encrypted data generation unit 110 generates a user list ul of identifying information of users shown by the attribute information set in the element $c_2$.

(S12: First Data Transmission Process)

A data transmission unit 120, by the communication device, sends the encrypted data c including the element $c_0$, $c_1$, $c_2$, $c_{d+1}$, E(r), E($\theta_1$), ul generated by the encrypted data generation unit 110 to the encrypted data management device 200.

The processes from S13 to S17 are the same as the first embodiment.

<Encrypted Data Acquisition Process>

With reference to FIG. 7, an encrypted data acquisition process related to the second embodiment will be explained, with focusing on a part different from the encrypted data acquisition process related to the first embodiment.

The processes from S21 to S24 are the same as the first embodiment.

(S25: Generation Number Re-Assignment Process)

S25 is, in principle, the same as the first embodiment. However, a different method is used to re-set the random number value r in the element $c_1$ of the encrypted data c.

Specifically, a key information setting unit 230 resets the random number value r like the following. Here, the element $c_1'$ is shown, in which the random number value r in the element $c_1$ is reset as indicated in Formula 37.

If the identifying information of the user included in the user list ul is not included in the invalidation information stored in an invalidation information management unit 250, the key information setting unit 230 generates the element $c_1'$ as indicated in Formula 39.

$$c_1' := (s_1 \vec{e}_{1,1} + \theta_1(1,-1), 0^{n_1}, 0^{n_1}, \eta_1) B_1 \qquad \text{<Formula 39>}$$

That is, r is reset to $-1$. $-1$, by which r is reset, is an initial value of $-1 \times$ the generation number.

The calculation indicated in Formula 40 is implemented, thereby acquiring the element $c_1'$ indicated in Formula 39 from the element $c_1$ indicated in Formula 37.

$$c_1' := c_1 - \theta_1 r b_{1,2} - \theta_1 b_{1,2} \qquad \text{<Formula 40>}$$

r and $\theta_1$ can be acquired by decrypting the elements E(r) and E($\theta_1$) of the encrypted data c using the domain secret key dsk stored in a key management unit 260. Also, $b_{1,1}$ and $b_{1,2}$ can be acquired from the basis B included in the public parameter pk.

If the identifying information of the user included in the user list ul is included in the invalidation information stored in the invalidation information management unit 250, the key information setting unit 230 generates the element $c_1'$ as indicated in Formula 41.

$$c_1' := (s_1 \vec{e}_{1,1} + \theta_1(1,-\rho_1), 0^{n_1}, 0^{n_1}, \eta_1) B_1 \qquad \text{<Formula 41>}$$

That is, r is reset to $-\rho_1$. $-\rho_1$, by which r is reset, is $-1 \times$(the value of the generation number of an invalid user secret key $k^*+1$). That is, if the user A is included in the user list ul, and 1 is included in the invalidation list as the generation number of the user secret key $k^*$ of the invalid user A, $-\rho_1$ becomes $-1 \times (1+1) = -2$.

The calculation indicated in Formula 42 is implemented, thereby acquiring the element $c_1'$ indicated in Formula 41 from the element $c_1$ indicated in Formula 37.

$$c_1' := c_1 - \theta_1 r b_{1,2} - \theta_1 \rho_1 b_{1,2} \qquad \text{<Formula 42>}$$

S26 is the same as the first embodiment.

S27 is also, in principle, the same as the first embodiment. However, a different decrypting method is used.

A decryption unit 140 implements, by the processing device, the calculation indicated in Formula 43, thereby decrypting the encrypted data c' using the user secret key $k^*$, and extracting the message m'.

$$m' := c_{d+1} / (e(c_0, k^*_0) \cdot \prod_{t=1}^{L} e(c_t, k^*_t)) \qquad \text{<Formula 43>}$$

As discussed above, if for each t of t=1, ..., L, the attribute information and the like ($\vec{v}_t$) set in the element $k^*_t$ in the user secret key $k^*$ corresponds to the attribute information and the like ($\vec{x}_t$) set in the element $c_t$ of the encrypted data c, the extracted m'=m. Then, that the attribute information and the like ($\vec{v}_t$) corresponds to the attribute information and the like ($\vec{x}_t$) means $\vec{v}_t \cdot \vec{x}_t = \sum_{i=1}^{n_t} v_{t,i} \cdot x_{t,i} = 0$ is satisfied.

Assume that the user terminal 100 includes the user secret key $k^*$ which is generated first and 1 is assigned as the generation number. That is, the user terminal 100 includes the user secret key $k^*$ indicated in Formula 44 in which 1 is set to $\rho$ of Formula 35.

$$k^*_0 := (\delta, 0, 1, \phi_0, 0) B^*_0$$

$$k^*_1 := (\delta(1,1), 0^{n_1}, \vec{\phi}_1, 0) B^*_1$$

$$k^*_2 := (\delta(\alpha,1), 0^{n_2}, \vec{\phi}_2, 0) B_2 \qquad \text{<Formula 44>}$$

Further, assume that at S11, the element $c_1$ of the encrypted data c is generated as indicated in Formula 45 (=Formula 37).

$$c_0 := (-s_0, 0, \zeta, 0, \eta_0) B_0$$

$$c_1 := (s_1 \vec{e}_{1,1} + \theta_1(1,r), 0^{n1}, 0^{n1}, \eta_1) B_1$$

$$c_2 := (s_2 \vec{e}_{2,1} + \theta_2(1,-\alpha), 0^{n2}, 0^{n2}, \eta_2) B_2 \qquad \text{<Formula 45>}$$

If the identifying information of the user included in the user list ul is not included in the invalidation information, the element $c_1'$ is generated as indicated in Formula 46 (=Formula 39).

$$c_1' := (s_1 \vec{e}_{1,1} + \theta_1(1,-1), 0^{n1}, 0^{n1}, \eta_1) B_1 \qquad \text{<Formula 46>}$$

In this case, in the user secret key $k^*$, $v_{1,1}$ and $v_{1,2}$ set to the coefficient of the basis vectors $b^*_{1,1}$ and $b^*_{1,2}$ of the basis $B^*_1$ are $v_{1,1}=1$ and $v_{1,2}=1$. Also, in the element $c_1'$, $x_{1,1}$ and $x_{1,2}$ set to the coefficient of the basis vectors $b_{1,1}$ and $b_{1,2}$ of the basis $B_1$ are $x_{1,1}=1$ and $x_{1,2}=-1$. Accordingly, $\vec{v}_1 \cdot \vec{x}_1 = \Sigma_{i=1}^2 v_{1,i} \cdot x_{1,i} = 1-1=0$. Further, in the user secret key $k^*$, $v_{2,1}$ and $v_{2,2}$ set to the coefficient of the basis vectors $b^*_{2,1}$ and $b^*_{2,2}$ of the basis $B^*_2$ are $v_{2,1}=\alpha$ and $v_{2,2}=1$. Also, in the element $c_1'$, $x_{2,1}$ and $x_{2,2}$ set to the coefficient of the basis vectors $b_{2,1}$ and $b_{2,2}$ of the basis $B_2$ are $x_{2,1}=1$ and $x_{2,2}=-\alpha$. Accordingly, $\vec{v}_2 \cdot \vec{x}_2 = \Sigma_{i=1}^2 v_{2,i} \cdot x_{2,i} = \alpha - \alpha = 0$. Therefore, the message m' extracted at S26 is equal to the message m set in the element $c_{d+1}$ of the encrypted data c at S11.

That is, the user secret key $k^*$ can decrypt the encrypted data c.

On the other hand, if the identifying information of the user included in the user list ul is included in the invalidation information, the element $c_1'$ is generated as indicated in Formula 47. Assume that the user secret key $k^*$ of which the value of the generation number is 1 is invalid.

$$c_1' := (s_1 \vec{e}_{1,1} + \theta_1(1,-2), 0^{n1}, 0^{n1}, \eta_1) B_1 \qquad \text{<Formula 47>}$$

In this case, $v_{1,1}=1$, $v_{1,2}=1$, and $x_{1,1}=1$, $x_{1,2}=-2$, so that $\vec{v}_1 \cdot \vec{x}_1 = \Sigma_{i=1}^2 v_{1,i} \cdot x_{1,i} = 1-2 \neq 0$. Accordingly, the message m' extracted at S26 is not equal to the message m set in the element $c_{d+1}$ of the encrypted data c at S11.

That is, the invalid user secret key $k^*$ cannot decrypt the encrypted data c.

However, assume that the user terminal 100 asks the key generation device 400 to re-generate the user secret key $k^*$, and acquires a user secret key $k^*$ in which 2 is assigned as the value of the generation number. That is, the user terminal 100 acquires the user secret key $k^*$ indicated in Formula 48 in which 2 is set to ρ of Formula 35.

$$k^*_0 := (\delta, 0, 1, \phi_0, 0) B^*_0$$

$$k^*_1 := (\delta(2,1), 0^{n1}, \vec{\phi}_1, 0) B^*_1$$

$$k^*_2 := (\delta(\alpha,1), 0^{n2}, \vec{\phi}_2, 0) B^*_2 \qquad \text{<Formula 48>}$$

In this case, $v_{1,1}=2$, $v_{1,2}=1$, and $x_{1,1}=1$, $x_{1,2}=-2$, so that $\vec{v}_1 \cdot \vec{x}_1 = \Sigma_{i=1}^2 v_{1,i} \cdot x_{1,i} = 2-2=0$. Further, $\vec{v}_2 \cdot \vec{x}_2 = \Sigma_{i=1}^2 v_{2,i} \cdot x_{2,i} = \alpha - \alpha = 0$. Therefore, the message m' extracted at S26 is equal to the message m set in the element $c_{d+1}$ of the encrypted data c at S11.

That is, if the user secret key $k^*$ is lost, the user secret key $k^*$ is re-generated, and thereby the encrypted data c can be decrypted.

Alternatively, it can be considered that the user terminal 100 acquires the encrypted data c from the encrypted data storage device 300 without via the encrypted data management device 200. However, in this case, the element $c_1$ of the encrypted data c is as indicated in Formula 49 (=Formula 37).

$$c_1 := (s_1 \vec{e}_{1,1} + \theta_1(1,r), 0^{n1}, 0^{n1}, \eta_1) B_1 \qquad \text{<Formula 49>}$$

In this case, since the random number value r is used, whatever the value of the generation number set in the user secret key $k^*$ is, $\Sigma_{i=1}^2 v_{1,i} \cdot x_{1,i} \neq 0$, which means the decryption is impossible.

As has been discussed above, the cryptographic processing system 10 related to the second embodiment can acquire the same effect as the cryptographic processing system 10 related to the first embodiment.

In the above explanation, the element $c_1$ of the encrypted data c is generated as indicated in Formula 36. However, the element $c_1$ can be generated without using the random number value $\theta_1$ as indicated in Formula 50. This is because r itself is the random number value, multiplication of another random number value is unnecessary.

$$c_1 := (s_1 \vec{e}_{1,1} + (1,r), 0^{n1}, 0^{n1}, \eta_1) B_1 \qquad \text{<Formula 50>}$$

Further, without setting the random number values to the basis vector which sets the key information, the whole element $c_1$ can be encrypted using the domain public key to generate the element $c_1$ as indicated in Formula 51. Setting the random number values to the basis vector which sets the key information prevents the decryption of the encrypted data when the user terminal 100 acquires the encrypted data c directly from the encrypted data storage device 300. The same effect can be acquired by encrypting the other parts of the element $c_1$ using the domain public key.

$$c_1 := E(s_1 \vec{e}_{1,1}, 0^{n1}, 0^{n1}, \eta_1) B_1 \qquad \text{<Formula 51>}$$

Embodiment 3.

In the first embodiment, the random number values $r_1$ and $r_2$ are set to the basis vectors in which the key information of the element $c_1$ of the encrypted data c is set, and thereby the security can be maintained when the user terminal 100 acquires the encrypted data c directly from the encrypted data storage device 300. Similarly, in the second embodiment, the random number value r is set to the basis vector in which the key information of the element $c_1$ of the encrypted data c is set, and thereby the security can be maintained in a case where the user terminal 100 acquires the encrypted data c directly from the encrypted data storage device 300.

In the third embodiment, a method will be explained, by which as simplifying the setting of the encrypted data c, the access control to the encrypted data storage device 300 is implemented, and thereby the security can be maintained in a case where the user terminal 100 acquires the encrypted data c directly from the encrypted data storage device 300.

The third embodiment will explain a case where the processes related to the first embodiment are applied; however, it is also possible to implement another case where the processes related to the second embodiment are applied in the same manner.

A configuration of a cryptographic processing system 10 is the same as the cryptographic processing system 10 related to the first embodiment shown in FIG. 1. Configurations of a user terminal 100 and a key generation device 400 are the same as the ones of the user terminal 100 and the key generation device 400 related to the first embodiment shown in FIGS. 2 and 5.

Figure 8:
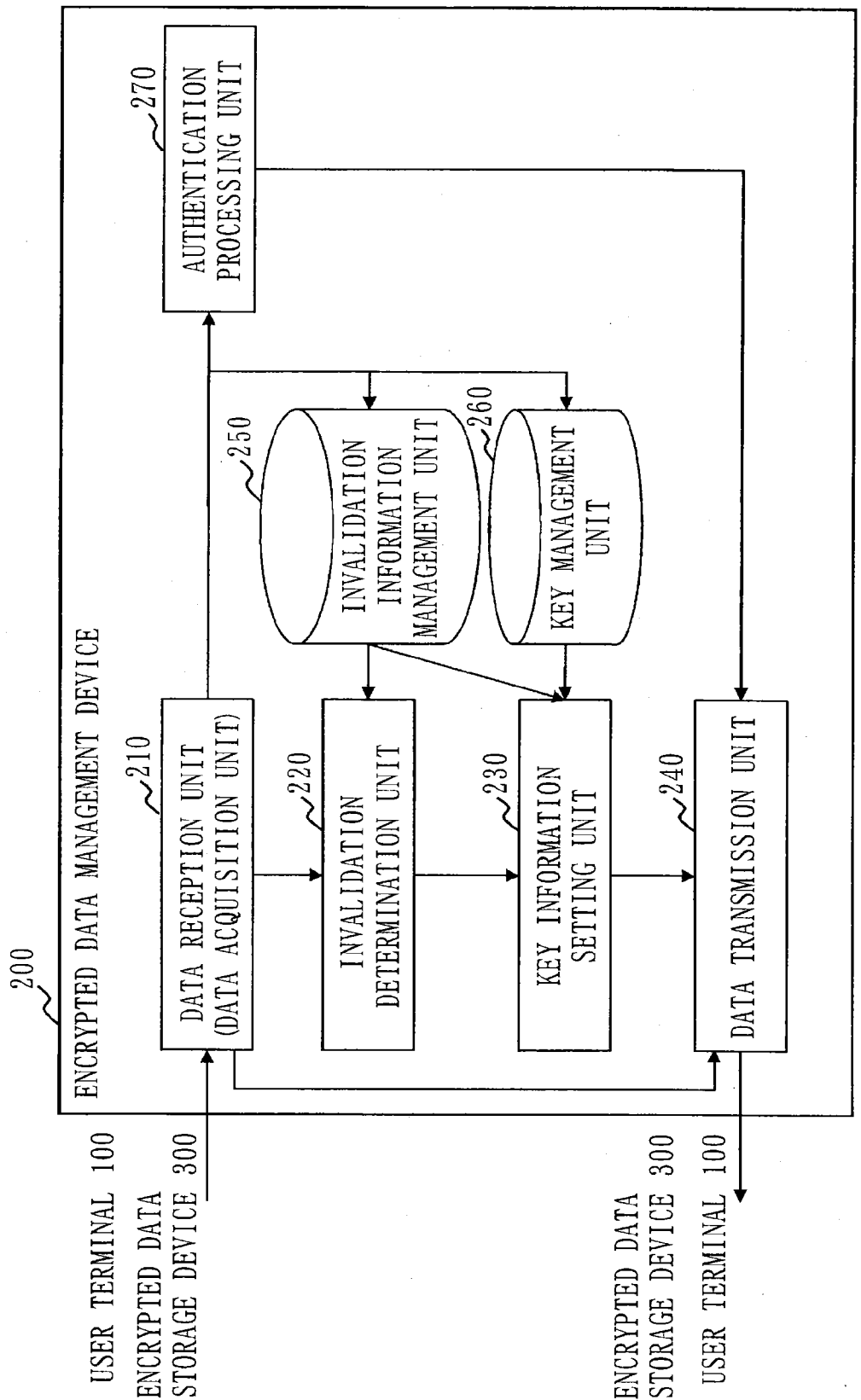
[FIG. 8] is a configuration diagram of an encrypted data management device 200 related to a third embodiment.

FIG. 8 is a configuration diagram of an encrypted data management device 200 related to the third embodiment.

In addition to the function of the encrypted data management device 200 related to the first embodiment shown in FIG. 3, the encrypted data management device 200 related to the third embodiment includes an authentication processing unit 270.

Figure 9:
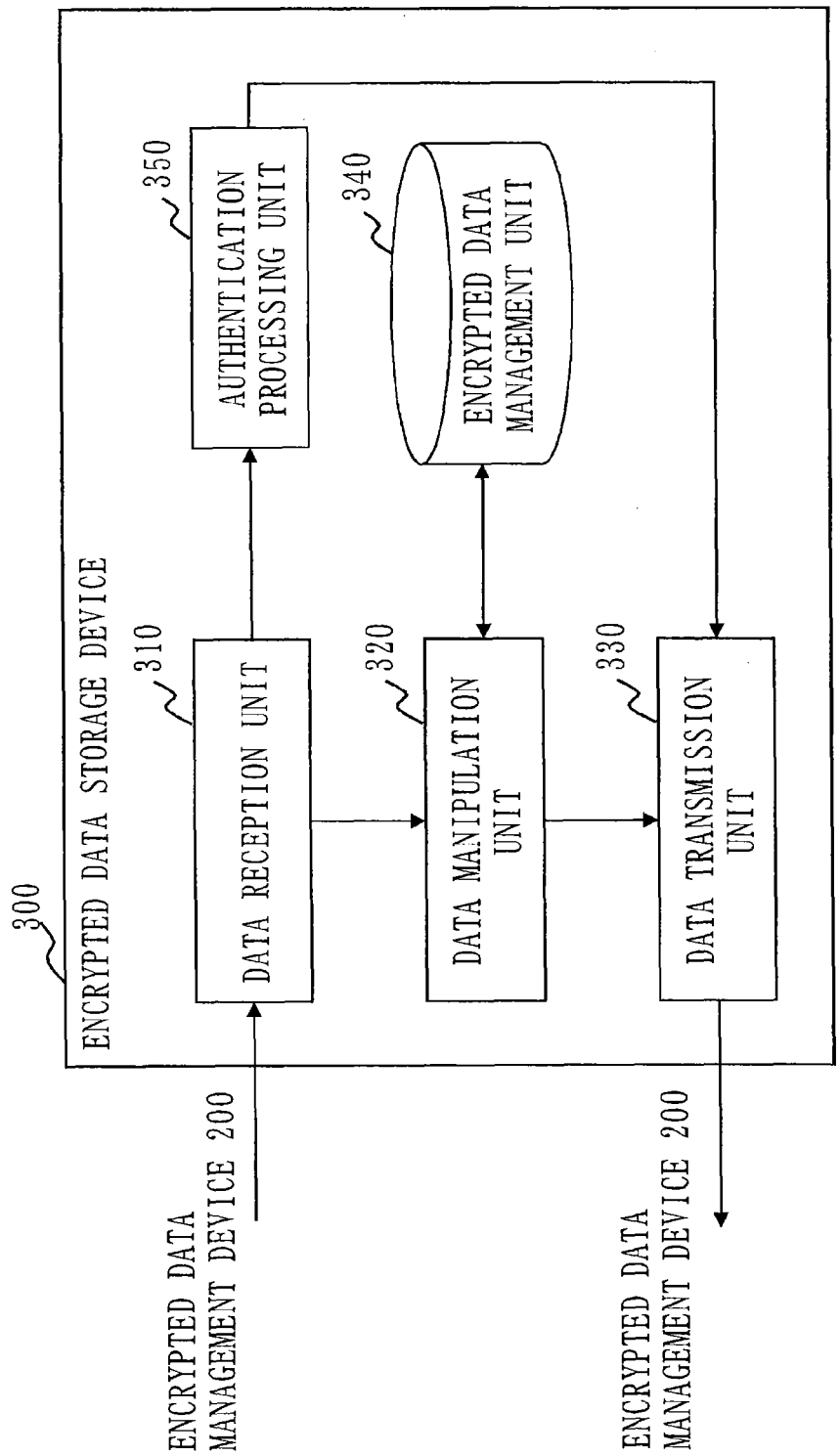
[FIG. 9] is a configuration diagram of an encrypted data storage device 300 related to the third embodiment.

FIG. 9 is a configuration diagram of an encrypted data storage device 300 related to the third embodiment.

In addition to the function of the encrypted data storage device 300 related to the first embodiment shown in FIG. 4, the encrypted data storage device 300 related to the third embodiment includes an authentication processing unit 350.

Three preconditions are, in principle, the same as the ones of the first embodiment.

However, the basis vectors $b_1$ and $b_2$ of the basis B included in the public parameter pk in the first embodiment are removed from a public parameter pk, and are sent only to the encrypted data management device 200 from a key generation device 400. At this time, the secure communication path employing SSL and the like is used in order to prevent eavesdropping and falsification.

<Encrypted Data Registration Process>

Figure 10:
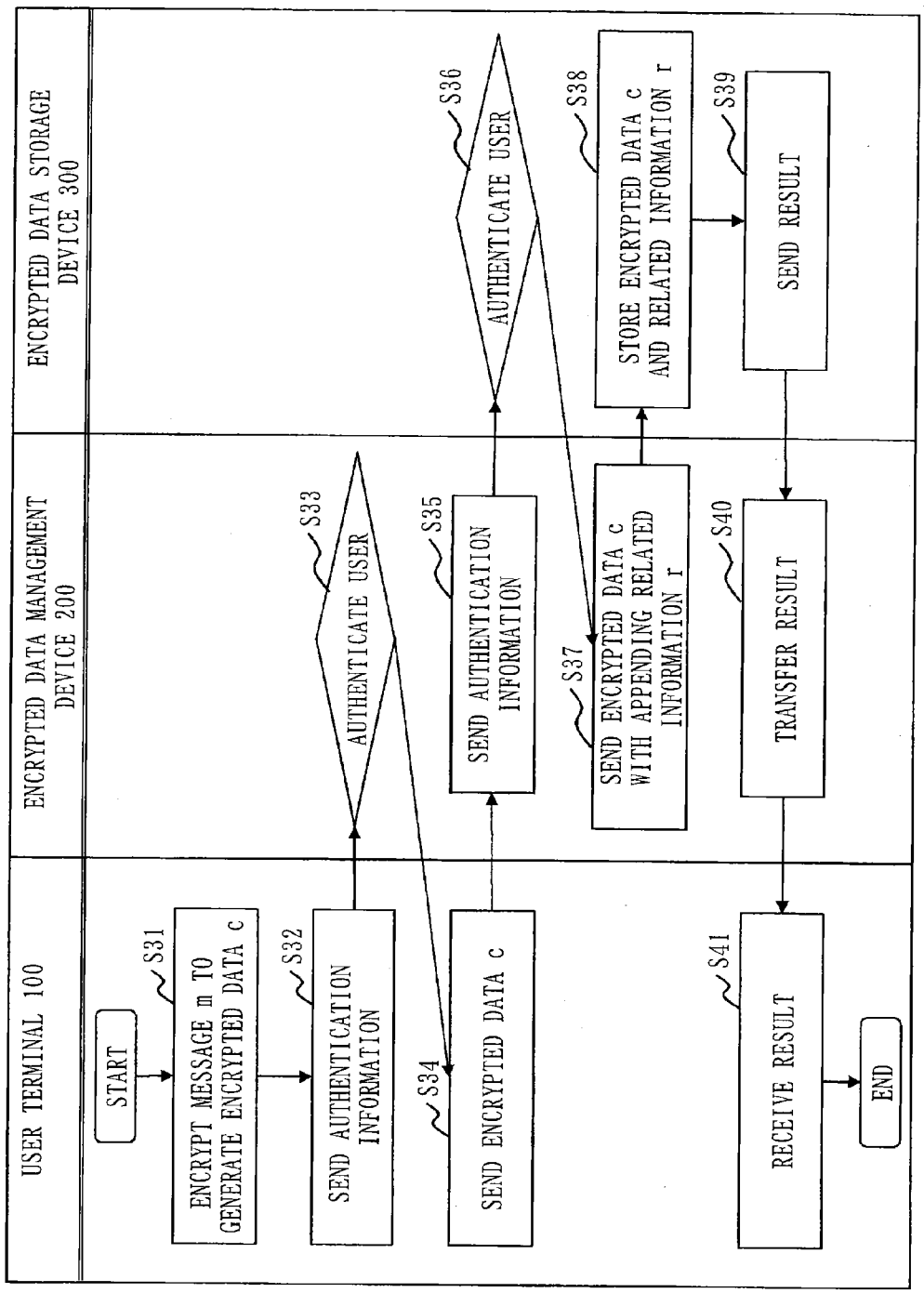
[FIG. 10] is a flowchart showing a flow of an encrypted data registration process related to the third embodiment.

FIG. 10 is a flowchart showing a flow of an encrypted data registration process related to the third embodiment.

(S31: Encryption Process)

An encrypted data generation unit 110 of the user terminal 100, similarly to S11 of FIG. 6, implements Enc algorithm and generates encrypted data c.

Here, the encrypted data generation unit 110 generates, by a processing device, an element $c_1$ of the encrypted data c as indicated in Formula 52.

$$c_1 := \omega(x_3 b_3 + x_4 b_4) + \zeta b_5 + \phi b_6 \qquad \text{<Formula 52>}$$

Note that $\omega$, $\zeta$, $\phi$ are random number values. To $x_3$ and $x_4$, attribute information of a user who can decrypt the encrypted data c are set.

Assuming that a value of the attribute information is $\alpha$, the encrypted data c is generated as indicated in Formula 53.

$$c_1 := \omega(b_3 - \alpha b_4) + \zeta b_5 + \phi b_6 \qquad \text{<Formula 53>}$$

That is, $x_3 := 1$ and $x_4 := -\alpha$.

The encrypted data generation unit 110 also generates element $c_2$, $E(\omega_1 r_1)$, $E(\omega_1 r_2)$ and ul similarly to S11 of FIG. 6.

(S32: First Authentication Information Transmission Process)

A data transmission unit 120 of the user terminal 100 sends, by a communication device, identifying information and a password of the user as authentication information to the encrypted data management device 200.

(S33: First Authentication Process) A data reception unit 210 of the encrypted data management device 200 receives, by a communication device, the identifying information and password of the user from the user terminal 100.

Then, the authentication processing unit 270 of the encrypted data management device 200 implements authentication of the user based on the identifying information and password of the user. For instance, the authentication processing unit 270 previously stores identifying information and a password for each user, and performs authentication by checking whether or not the received identifying information and password match the stored identifying information and password. If the authentication succeeds, the authentication processing unit 270 proceeds with the process to S34, and if the authentication fails, terminates the process.

(S34: First Data Transmission Process)

The data transmission unit 120 of the user terminal 100 sends, similarly to S12 of FIG. 6, the encrypted data c to the encrypted data management device 200.

(S35: Second Authentication Information Transmission Process)

The data reception unit 210 of the encrypted data management device 200 receives, by the communication device, the encrypted data c from the user terminal 100. Then, a data transmission unit 240 sends identifying information and a password of the encrypted data management device 200 as the authentication information to the encrypted data storage device 300.

(S36: Second Authentication Process)

A data reception unit 310 of the encrypted data storage device 300 receives, by a communication device, the identifying information and password of the encrypted data management device 200 from the user terminal 100.

Then, the authentication processing unit 350 of the encrypted data storage device 300 implements an authentication process based on the identifying information and password of the encrypted data management device 200. For instance, the authentication processing unit 350 previously stores the identifying information and password of the encrypted data management device 200, and implements authentication by checking whether or not the received identifying information and password match the stored identifying information and password. If the authentication succeeds, the authentication processing unit 350 proceeds with the process to S37, and if the authentication fails, terminates the process.

(S37: Second Data Transmission Process)

The data transmission unit 240 of the encrypted data management device 200 sends the encrypted data c to the encrypted data storage device 300 with appending related information r.

The processes from S38 to S41 are the same as the ones from S14 to S17 shown in FIG. 6.

<Encrypted Data Acquisition Process>

Figure 11:
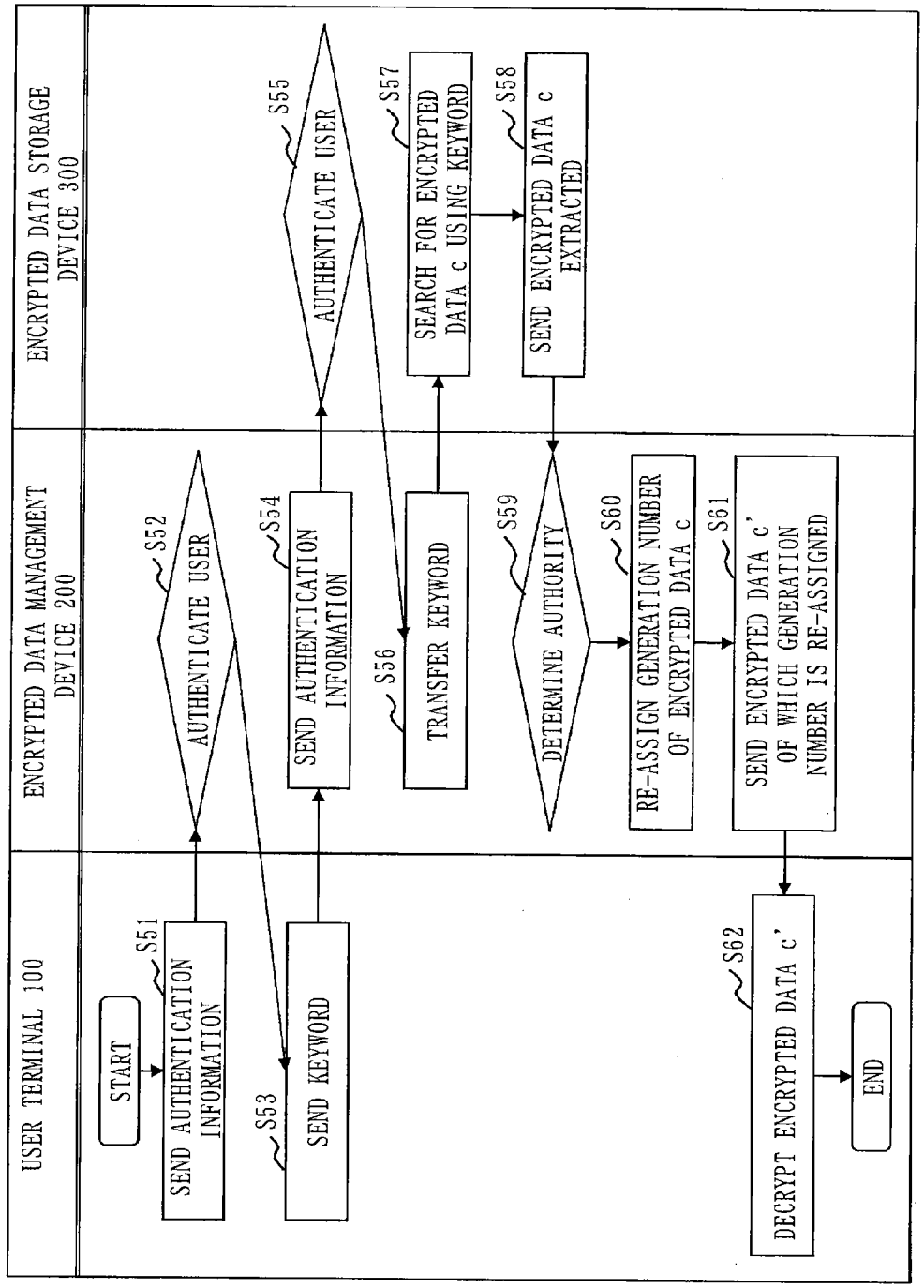
[FIG. 11] is a flowchart showing a flow of an encrypted data acquisition process related to the third embodiment.

FIG. 11 is a flowchart showing a flow of an encrypted data acquisition process related to the third embodiment.

(S51: First Authentication Information Transmission Process)

The data transmission unit 120 of the user terminal 100 sends, by the communication device, the identifying information and password of the user as the authentication information to the encrypted data management device 200.

(S52: First Authentication Process)

The data reception unit 210 of the encrypted data management device 200 receives, by the communication device, the identifying information and password of the user from the user terminal 100.

Then, the authentication processing unit 270 of the encrypted data management device 200 performs the authentication of the user based on the identifying information and password of the user. For instance, the authentication processing unit 270 performs the authentication with the same manner as S33. If the authentication succeeds, the authentication processing unit 270 proceeds with the process to S53, and if the authentication fails, terminates the process.

(S53: Keyword Transmission Process)

The data transmission unit 120 of the user terminal 100 sends, by the communication device, a keyword which can identify the encrypted data c to the encrypted data management device 200.

(S54: Second Authentication Information Transmission Process)

The data reception unit 210 of the encrypted data management device 200 receives, by the communication device, the keyword from the user terminal 100. Then, the data transmission unit 240 sends the identifying information and password of the encrypted data management device 200 as the authentication information to the encrypted data storage device 300.

(S55: Second Authentication Process)

The data reception unit 310 of the encrypted data storage device 300 receives, by the communication device, the identifying information and password of the encrypted data management device 200 from the user terminal 100.

Then, the authentication processing unit 350 of the encrypted data storage device 300 performs an authentication process based on the identifying information and password of the encrypted data management device 200. For instance, the authentication processing unit 350 performs the authentication in the same manner as S36. If the authentication succeeds, the authentication processing unit 350 proceeds with the process to S56, and if the authentication fails, terminates the process.

(S56: Keyword transfer process)

The data transmission unit 240 of the encrypted data management device 200 sends, by a communication device, the keyword to the encrypted data storage device 300.

The processes from S57 to S58 are the same as the ones from S23 to S24 shown in FIG. 7.

(S59: Authority Determination Process)

The data reception unit 210 of the encrypted data management device 200 receives, by the communication device, the encrypted data c from the encrypted data storage device 300.

Then, the authentication processing unit 270 of the encrypted data management device 200 determines, by a processing device, whether or not the identifying information of the user received at S52 is included in the user list ul of the encrypted data c. If it is included, the authentication processing unit 270 proceeds with the process to S60, and if not included, terminates the process.

(S60: Generation Number Re-Assignment Process)

An invalidation determination unit 220 of the encrypted data management device 200 determines, by a processing device, whether or not the identifying information of the user included in the user list ul of the encrypted data c is included in the invalidation information stored in an invalidation information management unit 250. A key information setting unit 230 sets, by a processing device, a different value according to the determination result of the invalidation determination unit 220 to the element $c_1$ of the encrypted data c and generates an element $c_1'$.

Specifically, the key information setting unit 230 sets values to the element $c_1$ like the following. In this case, the element $c_1'$ is shown, in which the values are set in the element $c_1$ indicated in Formula 53.

If the identifying information of the user included in the user list ul is not included in the invalidation information stored in the invalidation information management unit 250, the key information setting unit 230 generates the element $c_1'$ as indicated in Formula 54 (=Formula 10).

$$c_1' := \omega_1(b_1 - b_2) + \omega_2(b_3 - \alpha b_4) + \zeta b_5 + \phi b_6 \qquad \text{<Formula 54>}$$

That is, 1 is set to the coefficient of the basis vector $b_1$, and −1 is set to the coefficient of the basis vector $b_2$. −1, by which the coefficient of the basis vector $b_2$ is reset, is an initial value of −1×the generation number.

Here, the calculation indicated in Formula 55 is implemented, thereby acquiring the element $c_1'$ indicated in Formula 54 from the element $c_1$ indicated in Formula 53.

$$c_1' := c_1 + (\omega_1 b_1 - \omega_1 b_2) \qquad \text{<Formula 55>}$$

If the identifying information of the user included in the user list ul is included in the invalidation information stored in the invalidation information management unit 250, the key information setting unit 230 generates the element $c_1'$ as indicated in Formula 56 (=Formula 12).

$$c_1' := \omega_1(b_1 - \rho_1 b_2) + \omega_2(b_3 - \alpha b_4) + \zeta b_5 + \phi b_6 \qquad \text{<Formula 56>}$$

That is, 1 is set to the coefficient of the basis vector $b_1$, and $-\rho_1$ is set to the coefficient of the basis vector $b_2$. $-\rho_1$, which is set to the coefficient of the basis vector $b_2$, is −1×(the value of the generation number of the invalid user secret key k*+1).

The calculation indicated in Formula 57 is implemented, thereby acquiring the element $c_1'$ indicated in Formula 56 from the element $c_1$ indicated in Formula 53.

$$c_1' := c_1 + (\omega_1 b_1 - \omega_1 \rho_1 b_2) \qquad \text{<Formula 57>}$$

The processes from S61 to S62 are the same as the ones from S26 to S27 shown in FIG. 7.

As has been discussed, in the cryptographic processing system 10 related to the third embodiment, the encrypted data management device 200 and the encrypted data storage device 300 respectively perform the authentication. This operation prevents the acquisition of the encrypted data c by the user terminal 100 directly from the encrypted data storage device 300. Accordingly, the security can be maintained without setting random number values to the encrypted data c and the like.

Further, the cryptographic processing system 10 related to the third embodiment prevents the registration of fraudulent data in the encrypted data storage device 300 during the encrypted data registration process.

In the above explanation, the encrypted data management device 200 and the encrypted data storage device 300 respectively perform the authentication. However, it is also possible that the encrypted data management device 200 does not perform the authentication, but only the encrypted data storage device 300 performs the authentication. At least the encrypted data storage device 300 performs the authentication, thereby preventing the acquisition of the encrypted data c by the user terminal 100 directly from the encrypted data storage device 300 or the registration of fraudulent data in the encrypted data storage device 300.

Further, in the above explanation, the case where the processes related to the first embodiment are applied has been discussed. When the processes related to the second embodiment are applied, the processing flow is the same as the case of applying the processes related to the first embodiment. However, the element $c_1$ generated at S31 and the element $c_1'$ generated at S60 are different from the case of applying the processes related to the first embodiment.

In case of applying the processes related to the second embodiment, the element $c_1$ generated at S31 is as indicated in Formula 58.

$$c_1 := (s_1 \vec{e}_{1,1}, 0^{n1}, 0^{n1}, \eta_1) \mathbb{B}_1 \qquad \text{<Formula 58>}$$

Also, in case of applying the processes related to the second embodiment, the element $c_1'$ generated at S60 is as indicated in Formula 39 or Formula 41.

Also, the basis $\mathbb{B}_1$ included in the public parameter pk in the second embodiment is removed from the public parameter pk, and is sent only to the encrypted data management device 200 from the key generation device 400. At this time, the secure communication path employing SSL and the like is used in order to prevent eavesdropping and falsification.

The above embodiments merely show an example of methods to assign the key information and the attribute information to the user secret key k* and the encrypted data c; another method can be also used.

For instance, in the first embodiment, when the attribute information is α, α is set to the coefficient of the basis vector $b^*_3$, and 1 is set to the coefficient of the basis vector $b^*_4$ in the user secret key k*. Also, 1 is set to the coefficient of the basis vector $b_3$, and −α is set to the coefficient of the basis vector $b_4$ in the element $c_1$ of the encrypted data c. However, it is also possible, for instance, to set 1 to the coefficient of the basis vector $b^*_3$ and α to the coefficient of the basis vector $b^*_4$ in the user secret key k*; and to set −α to the coefficient of the basis vector $b_3$ and 1 to the coefficient of the basis vector $b_4$ in the element $c_1$ of the encrypted data c.

Further, without simply changing the basis vector in which the value is set, it is also possible to use a totally different method to assign the key information or the attribute information. Whichever assigning method is used, the invalidation scheme related to the above embodiments can be applied.

Further, the above embodiments have been explained methods to apply the invalidation scheme of key to the functional encryption scheme described in Non-Patent Literatures 1 and 2.

However, the invalidation scheme of key related to the above embodiments can be applied not only to the functional encryption scheme described in Non-Patent Literatures 1 and 2, but also to the functional encryption scheme to which the functional encryption scheme described in Non-Patent Literatures 1 and 2 are adopted.

Further, the invalidation scheme of key related to the above embodiments can be applied not only to the functional encryption scheme but also to another encryption scheme.

Further, the above embodiments have been explained the case where the message m is sent using the functional encryption scheme.

As for the encryption using the public key cryptosystem, a so-called hybrid encryption scheme is popularly used, in which data is usually encrypted using a common key and then the common key is encrypted using a public key of the user. In the hybrid encryption scheme, the common key encrypted using the public key of the user is appended to the encrypted data.

In the hybrid encryption scheme, if the encrypted common key is removed from the encrypted data, the data encrypted using the common key cannot be decrypted. However, in the functional encryption scheme, data being decryptable by a plurality of secret keys is encrypted using one public key. Accordingly, if the common key is appended in the same mechanism, only one encrypted common key is provided for the plurality of secret keys. That is, when the conventional scheme is applied, if one of the users becomes invalid, it is only the way to re-encrypt all the data in order to handle the case.

However, the invalidation scheme of key related to the above embodiments enable to invalidate the key even if the hybrid encryption scheme employing the functional encryption scheme is used. Here, in case of the hybrid encryption scheme, a common key (or original data to generate the common key) is set to encrypt contents as a message m.

Figure 12:
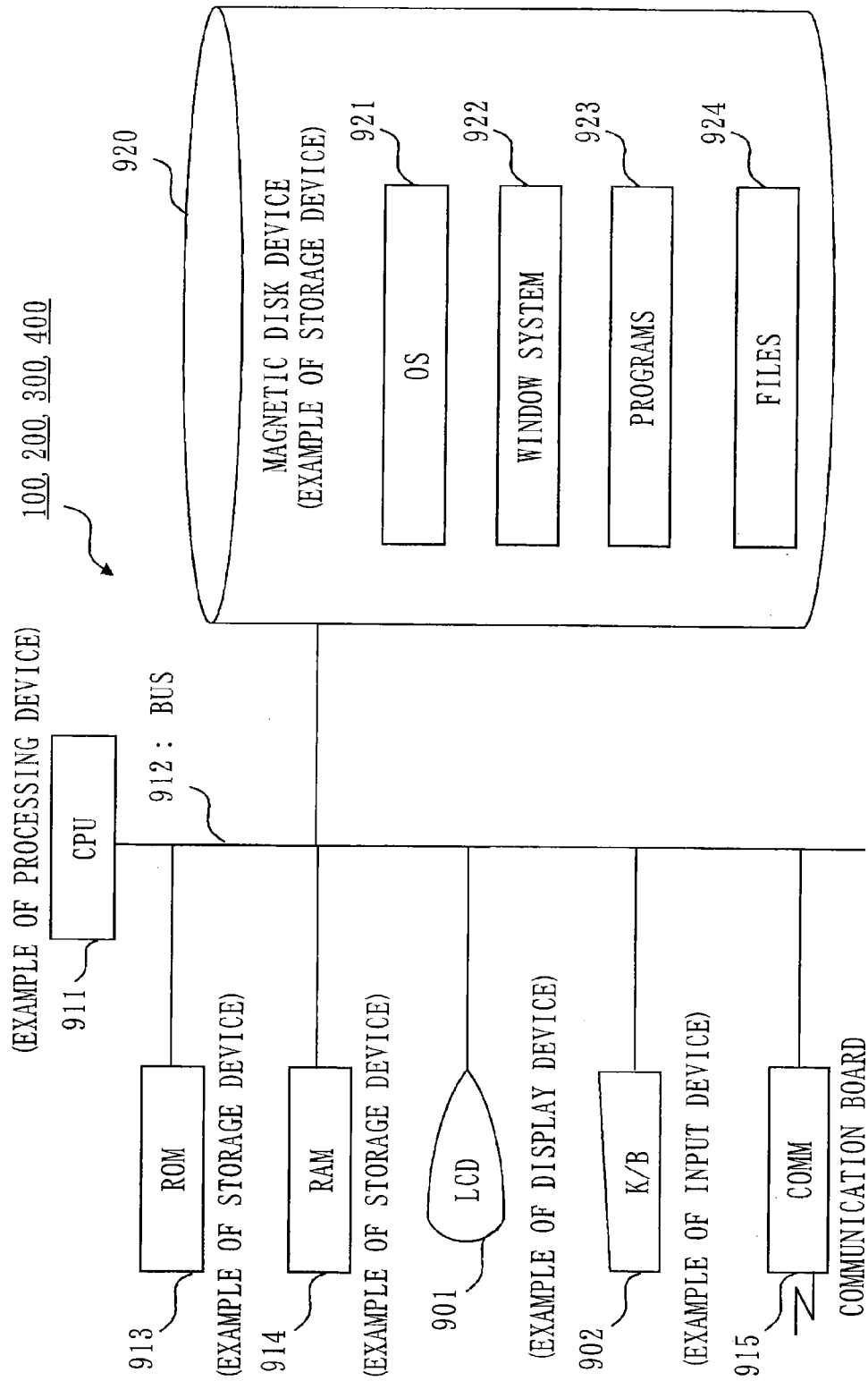
[FIG. 12] shows an example of hardware configuration of the user terminal 100, the encrypted data management device 200, the encrypted data storage device 300, and the key generation device 400.

FIG. 12 shows an example of hardware configuration of the user terminal 100, the encrypted data management device 200, the encrypted data storage device 300, and the key generation device 400.

As shown in FIG. 12, the user terminal 100, the encrypted data management device 200, the encrypted data storage device 300, and the key generation device 400 are provided with a CPU 911 (also referred to as a Central Processing Unit, central processing device, processing device, computation device, microprocessor, microcomputer, or processor) which executes programs. The CPU 911 is connected to a ROM 913, a RAM 914, a LCD 901 (Liquid Crystal Display), a keyboard 902 (K/B), a communication board 915, and a magnetic disk device 920 via a bus 912, and controls these hardware devices. In place of the magnetic disk device 920 (fixed disk drive), a storage device such as an optical disk device or memory card read/write device may be employed. The magnetic disk device 920 is connected via a predetermined fixed disk interface.

The ROM 913 and the magnetic disk device 920 are examples of a non-volatile memory. The RAM 914 is an example of a volatile memory. The ROM 913, the RAM 914, and the magnetic disk device 920 are examples of a storage device (memory). Further, the keyboard 902, and the communication board 915 are examples of an input device. Further, the communication board 915 is an example of a communication device. Moreover, the LCD 901 is an example of a display device.

The magnetic disk device 920, the ROM 913, or the like stores an operating system 921 (OS), a window system 922, programs 923, and files 924. The CPU 911, the operating system 921, and the window system 922 execute each program of the programs 923.

The programs 923 include software and programs that execute the functions described as the "encrypted data generation unit 110", the "data transmission unit 120", the "data reception unit 130", the "decryption unit 140", the "data reception unit 210", the "invalidation determination unit 220", the "key information setting unit 230", the "data transmission unit 240", the "authentication processing unit 270", the "data reception unit 310", the "data manipulation unit 320", the "data transmission unit 330", the "instruction reception unit 410", the "key generation unit 420", the "key transmission unit 430" and the like in the above description; and other programs. The programs are read and executed by the CPU 911.

The files 924 store information, data, signal values, variable values, and parameters to be stored in the "key management unit 150", the "invalidation information management unit 250", the "key management unit 260", the "encrypted data management unit 340", the "master key storage unit 440" and the like in the above explanation as the entries of a "file" or "database". The "file" or "database" is stored in a recording medium such as a disk or memory. The information, data, signal values, variable values, and parameters stored in a storage medium such as a disk or memory are read out to a main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or a buffer memory during the operations of the CPU 911 including extraction, search, look-up, comparison, computation, calculation, process, output, print, and display.

Further, the arrows in the flowcharts in the above explanation mainly represent input/output of data and signals. The data and signal values are stored in the memory of the RAM 914, the recording medium such as an optical disk, or in an IC chip. Further, the data and signals are transmitted online via a transmission medium such as the bus 912, signal lines, or cables; or electric waves.

Further, a "unit" in the above explanation may be a "circuit", a "device", "equipment", "means" or "function"; or a "step", "procedure", or "process". Further, a "device" may be a "circuit", "equipment", "means", or "function"; or a "step", "procedure", or "process". Further, "process" may be a "step". Namely, a "unit" may be realized as firmware stored in the ROM 913. Alternatively, a "unit" may be implemented by only software; by only hardware such as an element, a device, a substrate, or a wiring line; by a combination of software and hardware; or furthermore by a combination of software, hardware, and firmware. The firmware and software are stored, as programs, in the recording medium such as the ROM 913. The program is read by the CPU 911 and executed by the CPU 911. Namely, the program causes the computer or the like to function as a "unit" described above. Alternatively, the program causes the computer or the like to execute the procedure and method of the "unit" described above.

Reference Signs List

10: cryptographic processing system; 100: user terminal; 110: encrypted data generation unit; 120: data transmission unit; 130: data reception unit; 140: decryption unit; 150: key management unit; 200: encrypted data management device; 210: data reception unit; 220: invalidation determination unit; 230: key information setting unit; 240: data transmission unit; 250: invalidation information management unit; 260: key management unit; 270: authentication processing unit; 300: encrypted data storage device; 310: data reception unit; 320: data manipulation unit; 330: data transmission unit; 340: encrypted data management unit; 350: authentication processing unit; 400: key generation device; 410: instruction reception unit; 420: key generation unit; 430: key transmission unit; 440: master key storage unit

The invention claimed is:

1. An encrypted data management device managing encrypted data in an encryption scheme with which if attribute information and key information set in encrypted data do not correspond to attribute information and key information set in a secret key, the encrypted data cannot be decrypted using the secret key, the encrypted data management device comprising:

data acquisition circuitry which acquires encrypted data in which attribute information is set from a storage device;

invalidation determination circuitry which determines whether or not a user whose secret key is invalid is included in users having the attribute information set in the encrypted data acquired by the data acquisition circuitry;

key information setting circuitry which sets a different value as key information in the encrypted data based on whether or not it is determined that the user whose secret key is invalid is included by the invalidation determination circuitry; and a data transmission circuitry which sends the encrypted data in which the key information is set by the key information setting circuitry to a user terminal, wherein the data acquisition circuitry acquires an encrypted vector including an attribute vector in which the attribute information is set to a coefficient of a basis vector of an attribute basis which is a part of basis of a basis B[t] for each t of t=1, . . . , n (n being an integer of 2 or greater) and a key information vector of a key information basis which is a basis being different from the attribute basis of the basis B[t] as the encrypted data, and wherein the key information setting circuitry adds a vector in which the different value is set to a coefficient of a basis vector of the key information basis to the key information vector.

2. The encrypted data management device according to claim 1, wherein the data acquisition circuitry acquires encrypted data in which a random number value is set as the key information, and wherein the key information setting circuitry re-sets the different value to the key information set in the encrypted data acquired by the data acquisition circuitry.

3. The encrypted data management device according to claim 1, further comprising an invalidation information management circuitry which manages a generation number of an invalid secret key, wherein the key information setting circuitry, if it is determined that the user whose secret key is invalid is not included, sets an initial value of the generation number as the key information; and if it is determined that the user whose secret key is invalid is included, sets a value being different from the generation number managed by the invalidation information management circuitry as the key information.

4. The encrypted data management device according to claim 1, wherein the data acquisition circuitry acquires an encrypted vector in which the attribute information is set to a coefficient of a basis vector A which is a part of basis vectors of a predetermined basis B as the encrypted data, and wherein the key information setting circuitry sets the different value to a coefficient of a basis vector K which is a basis vector being different from the basis vector A of the basis B.

5. The encrypted data management device according to claim 4, wherein the data acquisition circuitry acquires encrypted data including the encrypted vector in which a random number value is set to the coefficient of the basis vector K, and an encrypted random number value which is the random number value encrypted, and wherein the key information setting circuitry decrypts the encrypted random number value, obtains the random number value, subtracts the vector in which the random number value is set to the coefficient of the basis vector K from the encrypted vector, and adds the vector in which the different value is set to the coefficient of the basis vector K to the encrypted vector.

6. The encrypted data management device according to claim 4, wherein the data acquisition circuitry acquires an encrypted vector in which 0 is set to the coefficient of the basis vector K as the encrypted data, and wherein the key information setting circuitry adds the vector in which the different value is set to the coefficient of the basis vector K to the encrypted vector.

7. The encrypted data management device according to claim 1, wherein the data acquisition circuitry acquires encrypted data including an encrypted vector having a vector in which a random number value is set to a coefficient of a predetermined basis vector K among basis vectors of the key information basis as the key information vector and an encrypted random number value which is the random number value encrypted, and wherein the key information setting circuitry decrypts the encrypted random number value, acquires the random number value, subtracts the vector in which the random number value is set to the coefficient of the basis vector K from the key information vector, and adds a vector in which the different value is set to the coefficient of the basis vector K to the key information vector.

8. The encrypted data management device according to claim 1, wherein the data acquisition circuitry acquires the encrypted vector in which 0 is set to a coefficient of a predetermined basis vector K among the basis vectors of the key information basis as the encrypted data, and wherein the key information setting circuitry adds a vector in which the different value is set to the coefficient of the basis vector K to the key information vector.

9. An encrypted data management method managing encrypted data in an encryption scheme with which if attribute information and key information set in encrypted data do not correspond to attribute information and key information set in a secret key, the encrypted data cannot be decrypted using the secret key, the encrypted data management method comprising:
- by communication circuitry, acquiring encrypted data in which attribute information is set from a storage circuitry;
- by processing circuitry, determining whether or not a user whose secret key is invalid is included in users having the attribute information set in the encrypted data acquired by the data acquisition step;
- by the processing circuitry, setting a different value as key information in the encrypted data based on whether or not it is determined that the user whose secret key is invalid is included by the invalidation determination step; and
- by the communication circuitry, sending the encrypted data in which the key information is set by the key information setting step to a user terminal,
- wherein the acquiring includes acquiring an encrypted vector including an attribute vector in which the attribute information is set to a coefficient of a basis vector of an attribute basis which is a part of basis of a basis B[t] for each t of t=1, . . . , n (n being an integer of 2 or greater) and a key information vector of a key information basis which is a basis being different from the attribute basis of the basis B[t] as the encrypted data, and
- wherein the setting includes adding a vector in which the different value is set to a coefficient of a basis vector of the key information basis to the key information_vector.

10. A non-transitory computer readable medium storing an encrypted data management program for managing encrypted data in an encryption scheme with which if attribute information and key information set in encrypted data do not correspond to attribute information and key information set in a secret key, the encrypted data cannot be decrypted using the secret key, the program causing a computer to execute:
- a data acquisition process which acquires encrypted data in which attribute information is set from a storage device;
- an invalidation determination process which determines whether or not a user whose secret key is invalid is included in users having the attribute information set in the encrypted data acquired by the data acquisition process;
- a key information setting process which sets a different value as key information in the encrypted data based on whether or not it is determined that the user whose secret key is invalid is included by the invalidation determination process; and
- a data transmission process which sends the encrypted data in which the key information is set by the key information setting process to a user terminal,
- wherein the data acquisition process acquires an encrypted vector including an attribute vector in which the attribute information is set to a coefficient of a basis vector of an attribute basis which is a part of basis of a basis B[t] for each t of t=1, . . . , n (n being an integer of 2 or greater) and a key information vector of a key information basis which is a basis being different from the attribute basis of the basis B[t] as the encrypted data, and
- wherein the key information setting process adds a vector in which the different value is set to a coefficient of a basis vector of the key information basis to the key information vector.

11. An encrypted data management device managing encrypted data in an encryption scheme with which if attribute information and key information set in encrypted data do not correspond to attribute information and key information set in a secret key, the encrypted data cannot be decrypted using the secret key, the encrypted data management device comprising:
- a hardware processor configured to:
  - acquire encrypted data in which attribute information is set from a memory;
  - determine whether or not a user whose secret key is invalid is included in users having the attribute information set in the acquired encrypted data;
  - set a different value as key information in the encrypted data based on whether or not it is determined that the user whose secret key is invalid is included in the users having the attribute information set in the acquired encrypted data; and
  - send the encrypted data in which the key information is set,
- wherein acquire encrypted data includes acquiring an encrypted vector including an attribute vector in which the attribute information is set to a coefficient of a basis vector of an attribute basis which is a part of basis of a basis B[t] for each t of t=1, . . . , n (n being an integer of 2 or greater) and a key information vector of a key information basis which is a basis being different from the attribute basis of the basis B[t] as the encrypted data, and
- wherein set a different value includes adding a vector in which the different value is set to a coefficient of a basis vector of the key information basis to the key information vector.

* * * * *